United States Patent [19]
Windle et al.

[11] Patent Number: 4,926,331
[45] Date of Patent: May 15, 1990

[54] TRUCK OPERATION MONITORING SYSTEM

[75] Inventors: William E. Windle, Antwerp, Ohio; Robert E. Zimmerman, Woodburn, Ind.; Ronald W. Glotzbach; Robert J. Onesti, both of Ft. Wayne, Ind.

[73] Assignee: Navistar International Transportation Corp., Chicago, Ill.

[21] Appl. No.: 287,691

[22] Filed: Dec. 20, 1988

Related U.S. Application Data

[63] Continuation of Ser. No. 833,298, Feb. 25, 1986, abandoned.

[51] Int. Cl.⁵ .................. G06F 13/00; G06F 15/20
[52] U.S. Cl. .................. 364/424.04; 364/424.03; 340/438
[58] Field of Search .......... 364/424.03, 424.04, 364/550, 551.01; 73/117.3; 340/52 R, 52 F, 438, 439; 360/5, 6

[56] References Cited

U.S. PATENT DOCUMENTS

| | | | |
|---|---|---|---|
| 4,041,393 | 8/1977 | Reed | 325/54 |
| 4,053,868 | 10/1977 | Cox et al. | 340/52 F |
| 4,067,061 | 1/1978 | Juhasz | 364/900 |
| 4,188,618 | 2/1980 | Weisbart | 340/52 F |
| 4,258,421 | 3/1981 | Juhasz et al. | 364/424 |
| 4,296,409 | 10/1981 | Whitaker et al. | 364/551 |
| 4,344,136 | 8/1982 | Panik | 364/424 |
| 4,395,624 | 7/1983 | Wartski | 377/15 |
| 4,442,424 | 4/1984 | Shirasaki et al. | 340/52 F |
| 4,527,241 | 7/1985 | Sheehan et al. | 364/424 |
| 4,528,687 | 7/1985 | Noso et al. | 381/43 |
| 4,551,801 | 11/1985 | Sokol | 364/424 |
| 4,564,916 | 1/1986 | Hori et al. | 364/551 |
| 4,593,357 | 6/1986 | Van Ostrand et al. | 340/52 F |
| 4,611,193 | 9/1986 | Brüggemann | 340/52 F |
| 4,644,334 | 2/1987 | Yato et al. | 340/52 F |
| 4,646,059 | 2/1987 | Iwamoto et al. | 340/52 F |
| 4,804,937 | 2/1989 | Barbiaux et al. | 364/550 |

Primary Examiner—Gary Chin
Attorney, Agent, or Firm—F. David AuBuchon; Dennis K. Sullivan

[57] ABSTRACT

The truck operation monitoring system is mounted in a truck cab and comprises: a plurality of sensors each positioned to sense an operating parameter of the truck; at least one primary instrumentation module mounted in the truck cab and including a data processing apparatus, means for coupling the sensors to the processing apparatus, memory means coupled to the data processing apparatus for storing data picked up from the sensors, and display means coupled to the data processing apparatus; means for manually calling up information on the display means and/or for inputting information into the processing apparatus; and means for communicating the memory means with a larger data processing apparatus. The system can also include a secondary instrumentation module mounted in the truck cab and having second display means for displaying truck operating parameters. The means for calling up or inputting information can be realized by a keyboard on the secondary instrumentation module. Further, a driver interface module can also be provided coupled to the primary instrumentation module including further display means, memory means, another data processing apparatus and a keyboard for inputting into the data processing apparatus and for calling up on the further display means, driver related information.

14 Claims, 30 Drawing Sheets

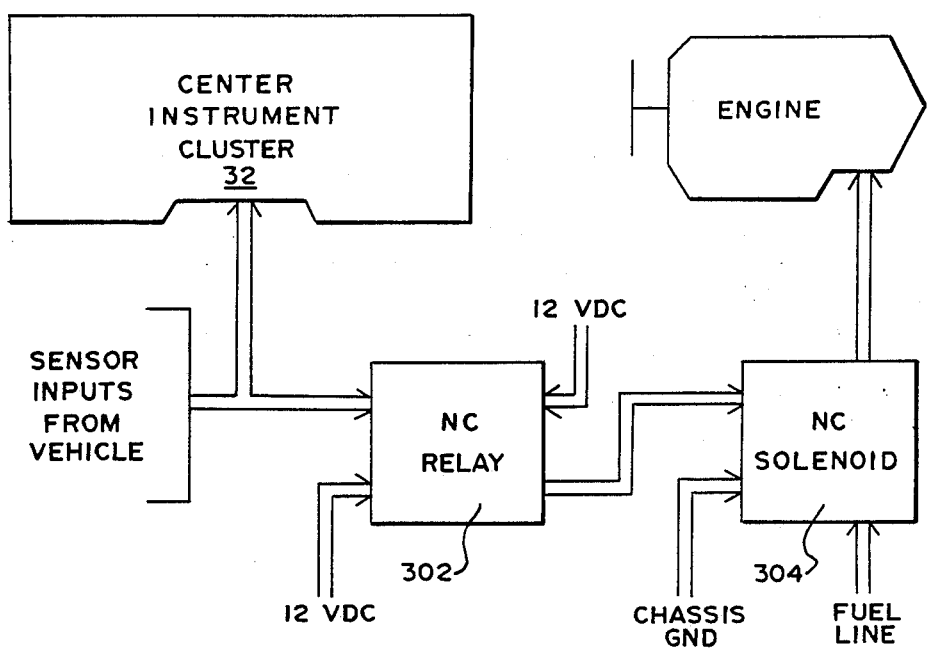
FIG. 33   ENGINE SHUTDOWN CIRCUITRY

FIG. 34 ENGINE SHUTDOWN SEQUENCE
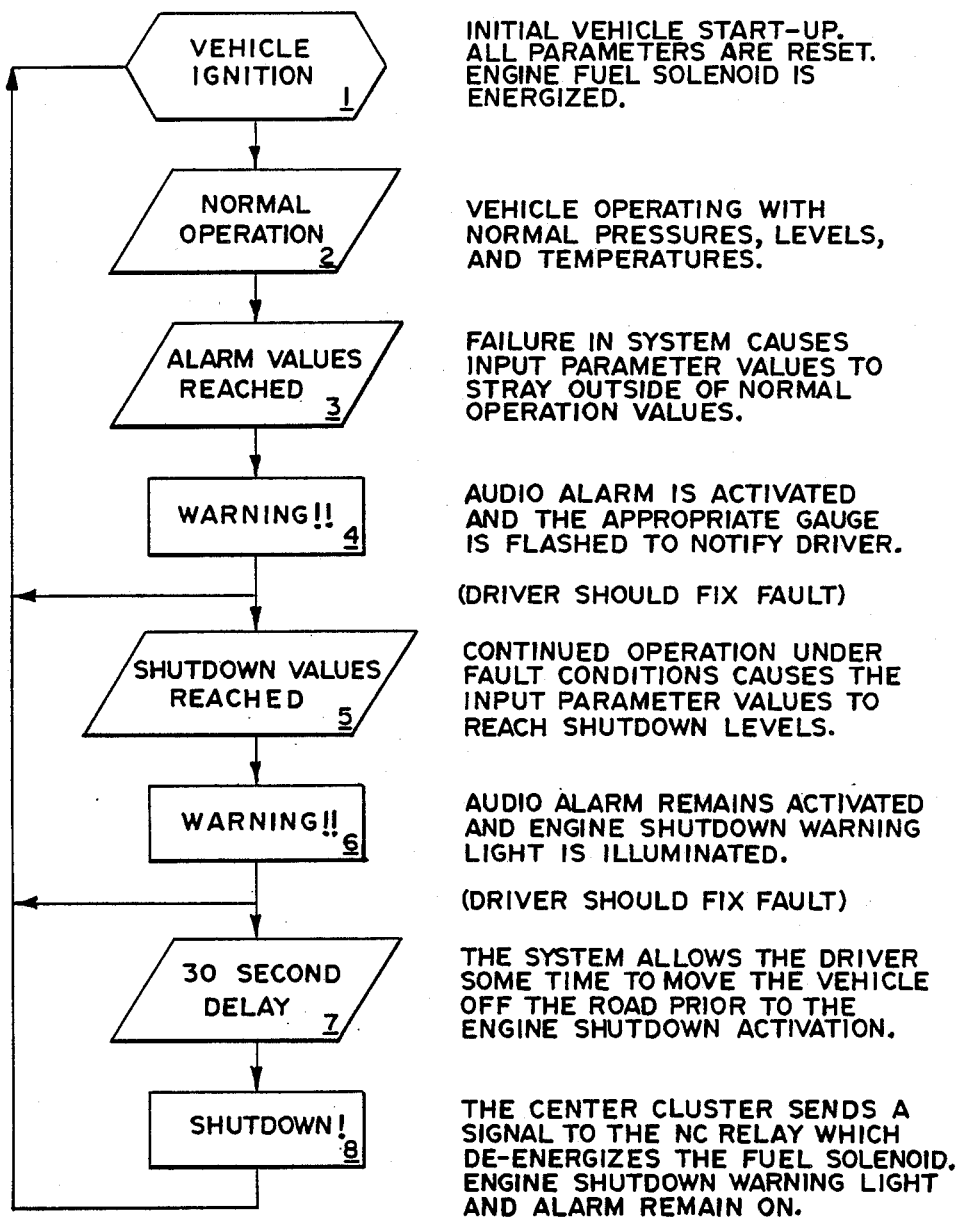

TRUCK OPERATION MONITORING SYSTEM

This is a continuation of copending application Ser. No. 833,298 filed Feb. 25, 1986 and now abandoned.

BACKGROUND OF THE INVENTION

This application claims priority from U.S. Pat. No. 4,677,429 to R. W. Glotzbach, issuing 06/30/87 from an application filed 12/01/83 for a VEHICLE INFORMATION ON-BOARD PROCESSOR.

1. Field of the Invention

The present invention relates to a truck operation monitoring system mounted in a truck and more particularly to a system which includes data processing apparatus, a plurality of truck operating parameter sensors coupled to the data processing apparatus, visual displays, memory for storing data and operating programs, at least one keyboard for operator input and operator callup, and a radio link for offloading data related to the operation of the truck to a distant larger processing apparatus for evaluation and storage of such data.

2. Description of the Prior Art

Heretofore trucks have had only a limited number of truck operation monitoring devices without the provision for integrated data storage.

With the advent of relatively inexpensive microprocessors with expanded memory, there have been proposals to use microprocessors in conjunction with the operation of motor vehicles.

For example, there is disclosed in U.S. Pat. No. 4,442,424 a method and system including a microcomputer for displaying vehicle operating parameters in a variable format. The parameters include vehicle speed, engine rpm fuel quantity, interior temperature and exterior temperature.

Further, there is disclosed in U.S. Pat. No. 4,462,079 an apparatus including a computer for providing information about the use of an agricultural work machine. Such information includes distance travelled, fuel consumption, working width of the machine, working time, total area to be worked and estimates of time-to-complete work or fuel consumption.

Also, in U.S. Pat. No. 4,525,782 there is disclosed a process for determining maintenance and servicing intervals on motor vehicles. More specifically, this patent teaches the processing of values corresponding to the particular states of wear of operating parameters of a motor vehicle and then comparing these values with values stored in a memory of the processing apparatus. When there is a comparison of the value being processed with the value stored in the memory, some form of indicator can be actuated to display a recommendation to the driver, or operator, to cause certain maintenance work to be performed.

Still another example of the use of a processing apparatus in conjunction with the operation of an engine for a motor vehicle is disclosed in U.S. Pat. No. 4,525,783 directed to a method and apparatus for determining the individual and manipulated variables of an internal combustion engine, and particularly, of a gas turbine. In particular, this patent measures rpm and temperature of the turbine and, based on the rpm sensed and/or the temperature sensed, will alter the operation of the turbine, such as by shutting off the turbine if these operating parameters are outside preset limits.

Additionally, U.S. Pat. No. 4,551,801 discloses a modular vehicle monitoring system which has a monitoring module with a plurality of inputs each for receiving one of the signals from one of a plurality of sensors. The inputs are fewer in number than the vehicle functions and conditions to be monitored and the module includes a sensor identifying arrangement.

As will be described in greater detail hereinafter, the truck operation monitoring system of the present invention differs from the previously proposed systems for monitoring the operation of a motor vehicle and the previously proposed systems utilizing a microprocessor for monitoring maintenance of a motor vehicle or for manipulating variables in the operation of an internal combustion engine, by providing a system which monitors and stores data for a large number of truck operation parameters, by providing for displays of these parameters to a truck operator including displays of out of limit conditions and displays of malfunctioning sensors, by providing memory for storing this data, a radio link for radio offloading of stored data and a serial port adapted to be connected to a larger processing apparatus when the truck is at a location permitting access to a communication link with the larger processing apparatus for offloading data therefrom.

The truck operation monitoring system of the present invention further differs from the previously proposed systems by including processing apparatus which is operable to receive and process analog signals received from sensors.

In one preferred embodiment of the truck operation monitoring system, a driver interface module is provided which enables driver generated information to be stored also. Such information can include driving time, sleep time, meal costs, costs for fuel, etc.

Furthermore, in one preferred embodiment of the truck operation monitoring system of the present invention a standard instrumentation gauge cluster, or module, can be provided including displays of nonrecorded truck operations such as turn signal lights and a secondary instrumentation gauge cluster or module can be coupled to the primary instrumentation gauge cluster module for facilitating display of additional truck operating parameters.

SUMMARY OF THE INVENTION

According to the present invention, there is provided a truck operation monitoring system for use in a truck cab comprising: a plurality of sensors each positioned to sense an operating parameter of the truck; at least one primary instrumentation module mounted in the truck cab including a data processing apparatus, means for coupling said sensors to said data processing apparatus, display means coupled to said data processing means, and memory means coupled to said data processing apparatus for storing data picked up from said sensors; means for manually calling up information on said display means and/or for inputting information into said data processing apparatus; and means for communicating said memory means with a larger data processing apparatus, such as a processing apparatus at a remote location.

The system can also include a secondary instrumentation module mounted in the truck cab and having second display means for displaying truck operating parameters. The means for calling up or inputting information can be realized by a keyboard on the secondary instrumentation module.

Further, a driver interface module can also be provided coupled to the primary instrument module and including further display means, memory means, another data processing apparatus and a keyboard for inputting into the data processing apparatus and for calling up on the further display means, driver related information.

BRIEF DESCRIPTION OF THE DRAWINGS

FIG. 33 is a block schematic diagram of the engine shutdown circuit of the truck operating monitoring system of the present invention.

FIG. 34 is a flow chart of the routine or protocol carried out by the microprocessor in the primary module for the engine shutdown sequences.

DESCRIPTION OF THE PREFERRED EMBODIMENT

Figure 1:
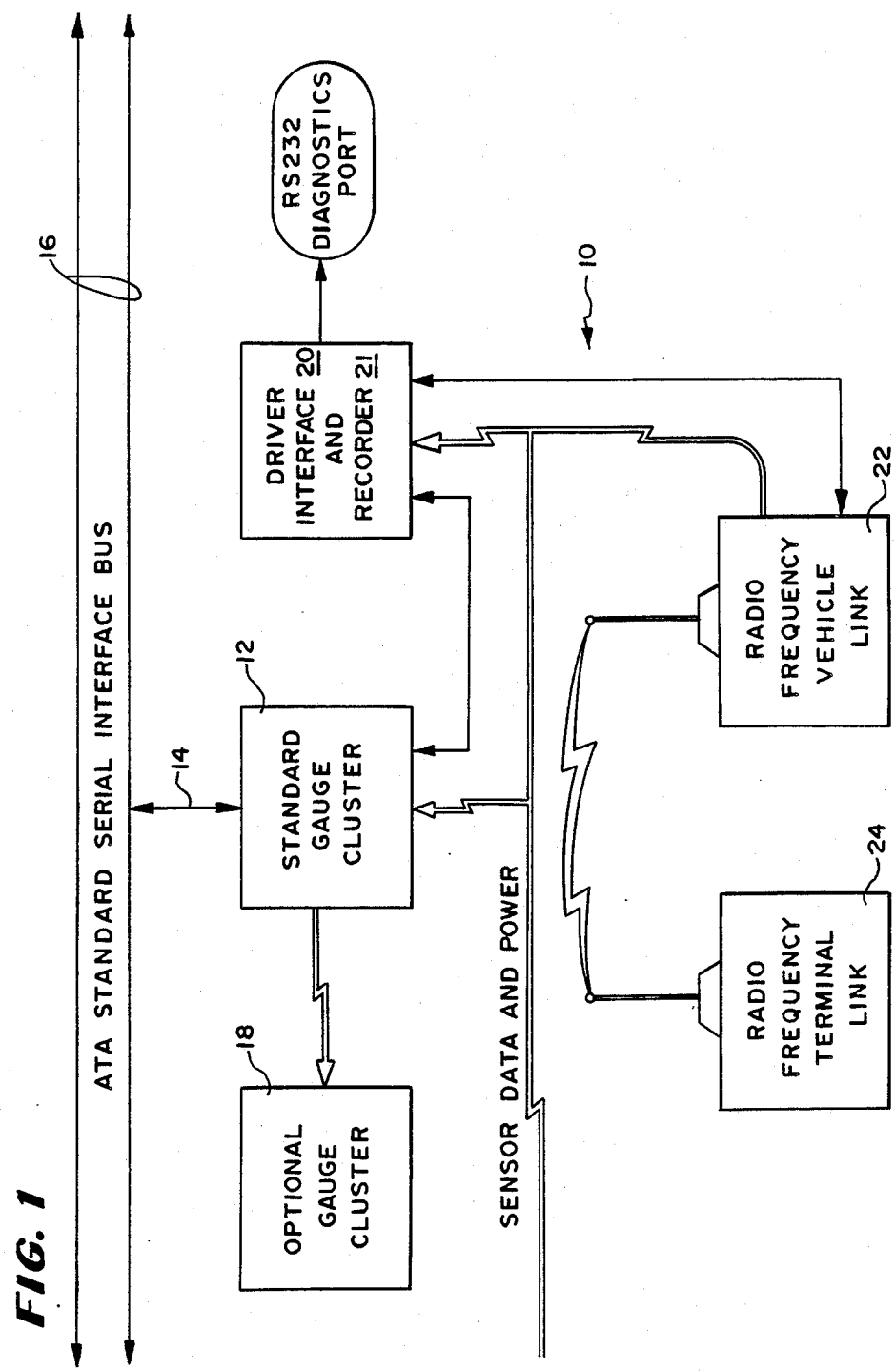
FIG. 1 is a block diagram of the truck operation monitoring system of the present invention and shows modules thereof, the interconnection of the modules and various ways of coupling to the modules for obtaining data therefrom.

Referring now to the drawings in greater detail, there is illustrated in FIG. 1 a block diagram of the truck operation monitoring system 10 of the present invention. The system 10 includes a standard instrumentation gauge cluster or module 12 which, as will be described in greater detail hereinafter, includes a data processing apparatus (microprocessor).

This standard instrumentation gauge module 12 has input/output ports 14 for coupling the module 12 to an ATA standards serial interface bus 16. The standard instrumentation gauge module 12 is also coupled to a secondary, or optional, instrumentation gauge cluster module 18.

The instrumentation gauges that are included in the primary module 12 and the secondary module 18 will be described in greater detail in connection with the description of FIGS. 3 and 4.

In addition to the instrumentation gauge modules 12 and 18, a driver interface module 20 and recorder module 21 can be coupled to the primary instrumentation gauge module 12 as shown. Such module 20 and 21 can be incorporated in a single module, if desired.

Data from sensors and power for operating the modules 12, 18, 20 and 21 are supplied to the primary instrumentation gauge module 12, and to the driver interface module 20 and recorder module 21.

Preferably, and as shown, the driver interface module 20 is also coupled to a radio frequency link 22 which is also supplied with power from the vehicle power supply.

The driver interface module 20/recorder module 21 will be described in greater detail in connection with the description of FIGS. 5, 6 and 11.

The radio frequency link 22 enables data which has been developed from the sensors and stored in the recorder module 21 to be offloaded from the truck operation monitoring system 10 to a radio frequency terminal link 24 and processed and stored in a larger processing apparatus coupled to the radio frequency terminal link 24.

Such data can also include data entered by a driver of the truck in the driver interface module 20.

Preferably, and as shown, the driver interface module 20 and associated recorder module 21 are coupled to an ATA data link diagnostics port by which the system 10 can be checked in a diagnostics routine.

Figure 2:
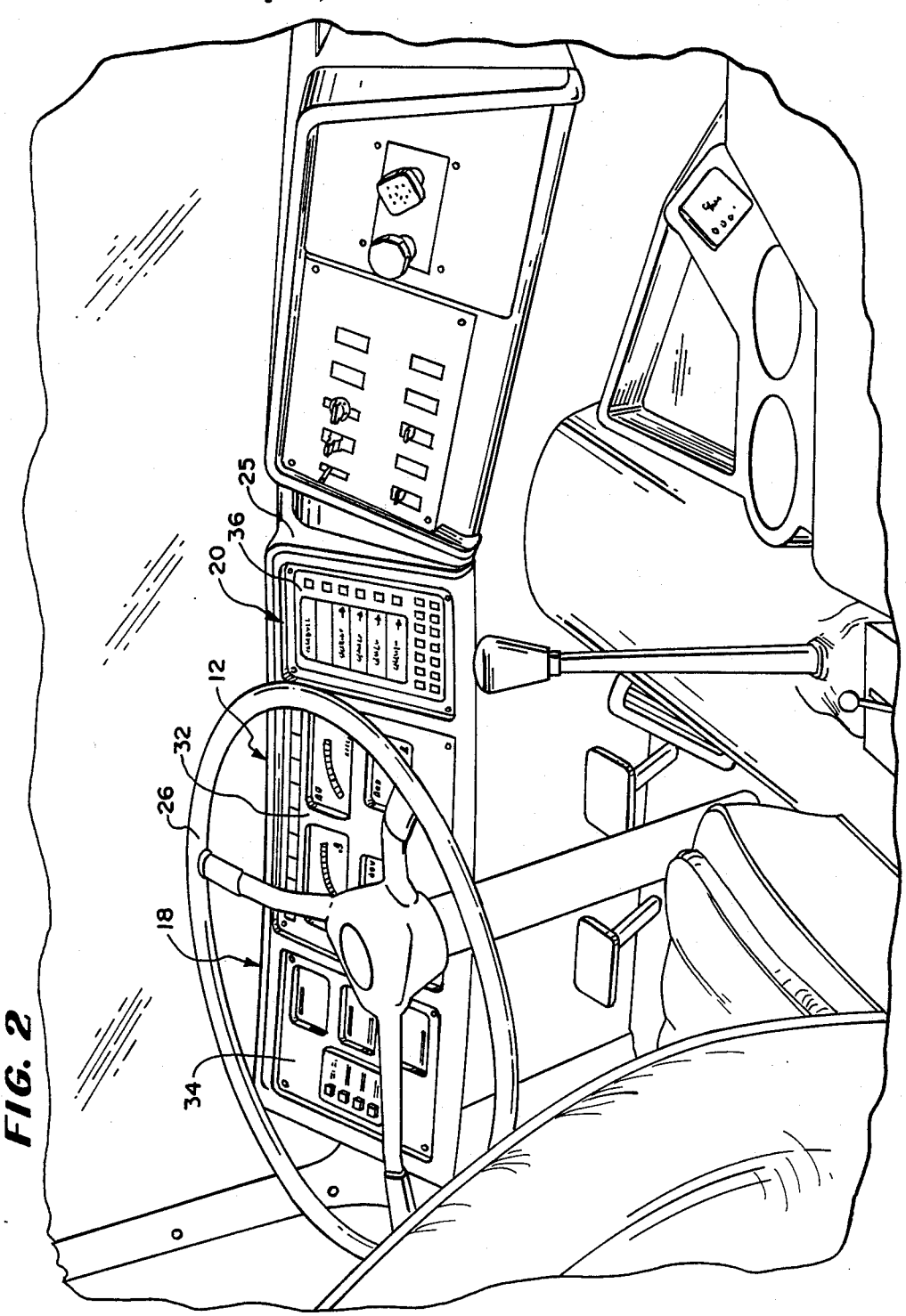
FIG. 2 is an enlarged perspective view of the dashboard in a cab of a truck and shows three truck operation monitoring system modules of the truck operation monitoring system of the present invention mounted on the dashboard.

As best shown in FIG. 2, the primary module 12, the secondary module 18 and driver interface module 20 are mounted on the dashboard 25 of a truck right in front of the steering wheel 26 and include a primary instrumentation panel 32, a secondary instrumentation panel 34 and a driver interface panel 36 which are shown in larger detail in FIGS. 3, 4 and 5 and which will be described in greater detail in connection with the description of FIGS. 3, 4 and 5.

Figure 3:
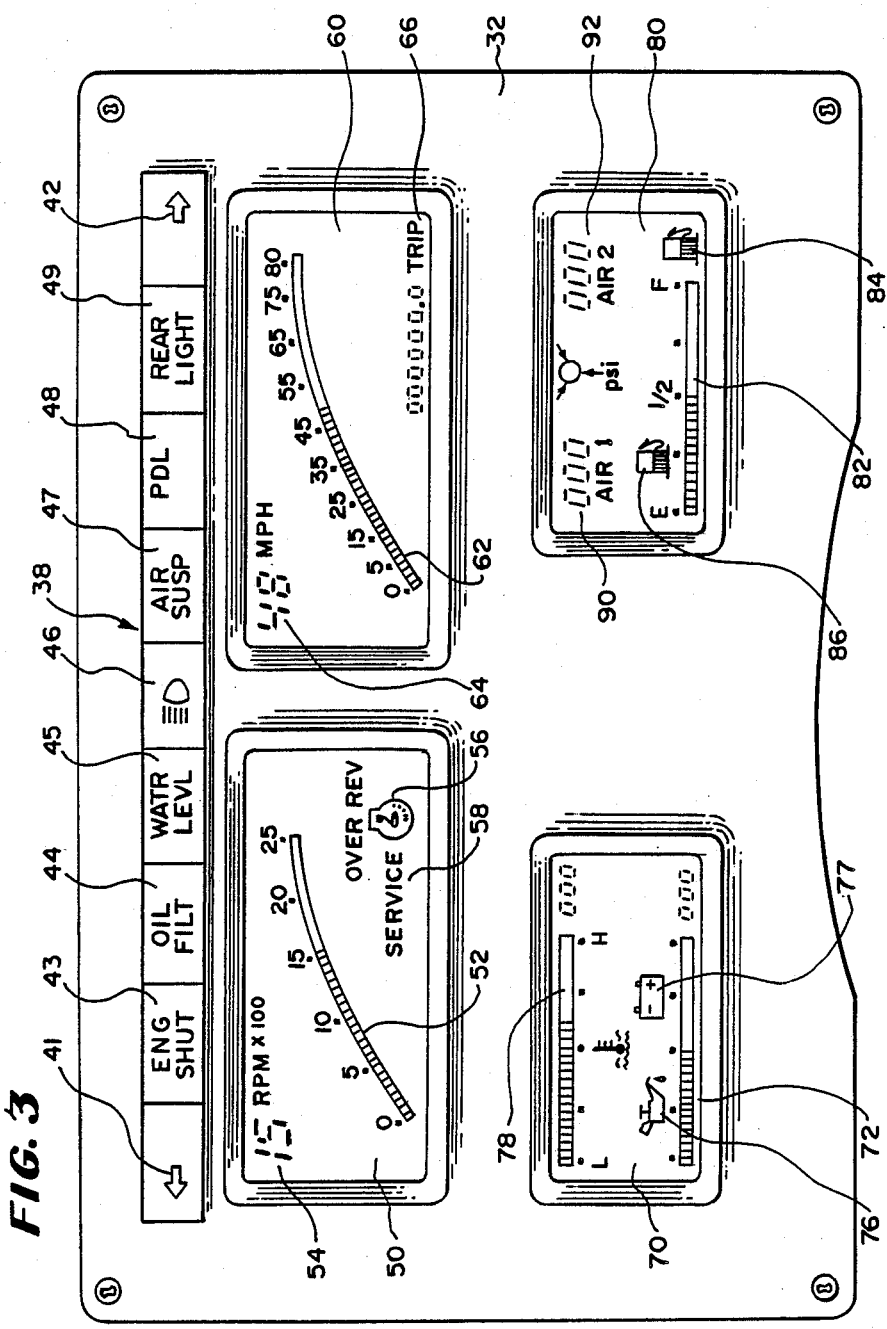
FIG. 3 is a front plan view of the primary or standard gauge instrumentation cluster module.

Referring now to FIG. 3, the primary instrumentation panel 32 has an upper elongate indicator display area 38 which includes a left hand turn arrow signal indicator display 41, a right hand turn arrow signal indicator display 42, an engine shutdown indicator display 43, an oil filter indicator display 44, a water level indicator display 45, a high-beam indicator display 46, an air suspension indicator display 47, a power divider lock indicator display 48 and a rear light indicator display 49.

It will be appreciated that this upper indicator display area 38 shows confirmation of driver initiated truck operations as well as sensor indications. For example, whenever the driver makes a right hand turn or a left hand turn, the arrows 41 or 42 will light up. Also, of course, truck operations or sensor indications other than those shown can be inserted on indicator display area 38 as desired. In this respect, assembly line application of indicator films for any sensor indication desired provides savings in stock and overhead costs.

The engine shutdown sequence for causing the engine shutdown display to light up will be described below in connection with the description of FIGS. 33 and 34.

In addition to these upper visual displays 41–49, the primary instrumentation panel 32 includes a tachometer gauge 50 having both an analog display 52 and a digital display 54. Additionally, when the engine rpm is above a high set limit an "over rev", indicator 56 will light up. The over rev indicator set point is programmable by the user via the ATA input port 14 or via a keyboard input (keyboard 99 shown in FIG. 4). Also, a service indicator light 58 is provided in the gauge 50 and will light up after a large number of engine rpms or miles (a number input by maintenance personnel) have been counted to indicate that the engine should be serviced, or the input sensor is defective or an ATA communication link has failed. Again, this is programmable by the user via the ATA input port 14 or the keyboard 99 (FIG. 4).

The tachometer 50 operates between a frequency input of between 0 and 5000 Hertz. The analog display 52 will have 100 rpm increments between 0 and 2500 rpm and the display update rate is between 10 and 15 per second.

The digital display 54 is in multiples of 10 rpm increments and "rpm × 100" is provided beside the digital display.

The conversion factor from rpm to Hertz is rpm × teeth per revolution on the flywheel (stored in an EEPROM) divided by 60.

Further, there is provided on the primary instrumentation module a speedometer 60 which has an analog display 62 and a digital display 64. Also, a nonvolatile electronic odometer or trip indicator 66 is provided in the lower right hand corner of the speedometer gauge 60.

The speedometer 60 will operate on a frequency input of between 0 and 2200 Hertz and will show miles per hour in digital increments of 1 mph and analog increments of 2.5 mph between 0 and 80 mph.

The display update rate is 5 times per second. The conversion from mph to Hertz is tire revolutions per mile × axle ratio × 16 divided by 3600 to give an input in Hertz. The pulses per mile are stored in an EEPROM.

A reluctance sensor used for the tachometer and the speedometer can be a Motorola Reluctance Sensor, Model No. 7PE20005A, 7PE20005B and 7PE20003C or equivalent with a 690 ohm nominal DC resistance. Also, the calibration here is programmable by the user via the ATA input 14 or the keyboard 99 (FIG. 4).

Beneath the tachometer is a multifunction gauge 70 which has in the lower portion thereof a digital and analog engine oil level/battery charge display 72. Depression of key button 74 (FIG. 4) will switch or alternate the display 72 between oil level and battery charge.

If oil pressure is called up, an oil can indicia 76 will be illuminated. Likewise, if battery charge is called up, an indicia 77 of a battery is illuminated.

The upper part of the gauge 70 has an analog display 78 which is used to display water temperature.

Beneath the speedometer 60 is another multifunction gauge 80 which has in the lower portion thereof an analog fuel display 82.

A gas pump image 84 is provided alongside the scale for the analog display 82 to show that this is a fuel gauge. Also, when the fuel level reaches a lower user programmable level, such as ¼ tank, an image 86 of a gas pump will appear above the analog display 82. The fuel level display 82 typically utilizes a 0–94 ohm variable resistor with 0 being equal to a full tank and 94 ohms being equal to an empty tank. The analog display 82 has 16 bar segments for showing different levels of fuel.

Additionally, the gauge 80 includes digital air pressure indicators 90 and 92 for primary air pressure and secondary air pressure. The primary and secondary air pressure indicators 90 and 92, are coupled to sensors that sense pressures between 0 and 100 psi over a voltage range of 0 to 4.75 volts.

A bad pressure sensor will cause a display of about 135 psi. Also, pressure below 60 psi will give an audio alarm and a flashing display alarm.

All of the displays 52, 62, 72, 78, 82, 90 and 92 will indicate a sensor malfunction when they reach an upper limit and will flash on and off to indicate to the driver that there is a sensor malfunction. Also, the displays are typically updated five times per second.

When power is turned on, there is an automatic diagnostic test which lasts for three seconds. When this occurs, the engine shutdown lamp and LCD segments behind the indicator displays 41–49 are tested. Backlighting, however, will not be affected. Then, after three seconds the panel 32 will display all currently measured data inputs. During this diagnostic test, any diagnostic failures sensed are sent to the recorder 21.

Typically, two circuit boards are provided in the module 12 (FIG. 2), one for graphics, i.e. drivers for the LCD displays 52, etc., and one for power supply, analog input circuitry, A.G.C. connectors, microprocessor and memory (Motorola 68HC11).

Figure 4:
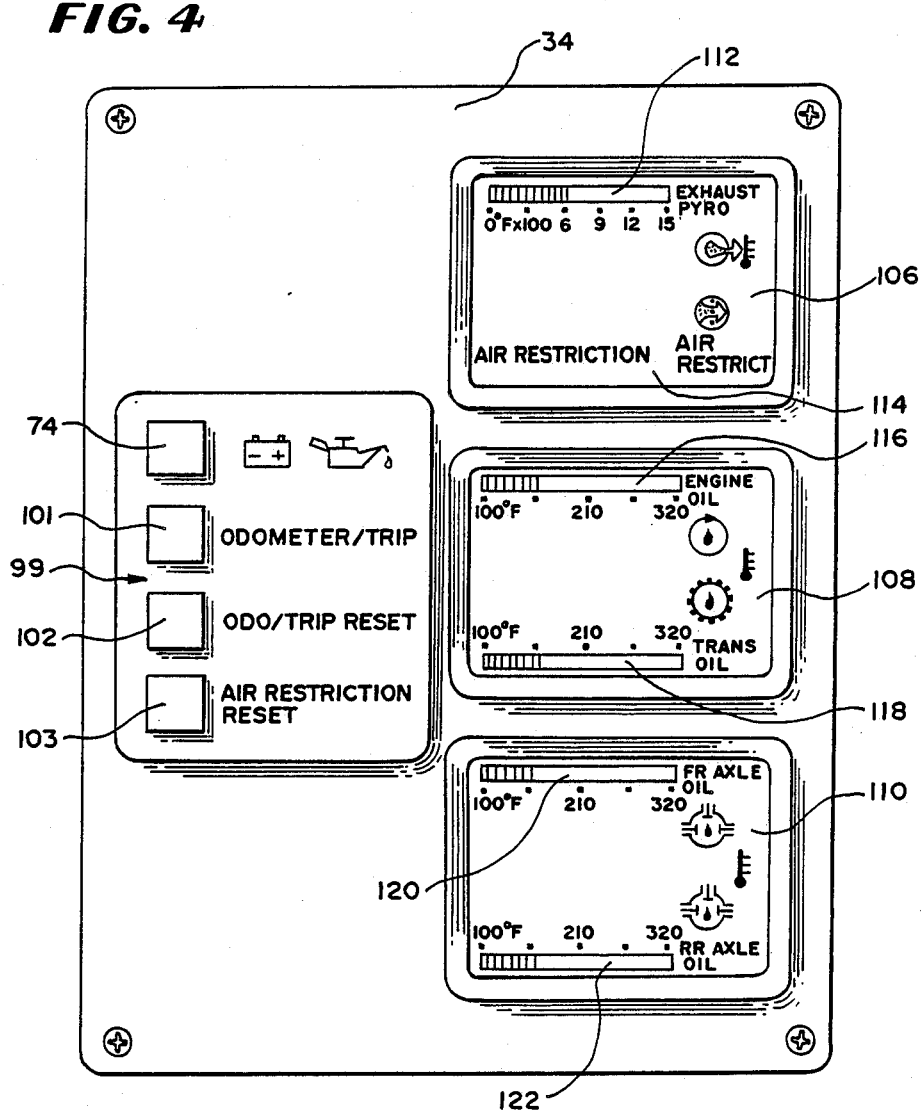
FIG. 4 is a front plan view of the optional or secondary gauge instrumentation cluster module.

Referring now to FIG. 4, there is illustrated therein the secondary instrumentation panel 34 which has a keyboard 99 with keys or buttons 74, 101, 102 and 103 which the driver can depress for calling up a display of certain operating parameters which will be described in greater detail below.

For example, the key or button 74 is depressed to call up oil or voltage on display 70 (FIG. 3). Button 101 can be depressed for setting the odometer reading for TOTAL or TRIP on display 70 (FIG. 3). Button 102 can be depressed to reset the TRIP odometer to zero miles on display 60 if it is in the TRIP mode and finally, button 103 can be depressed to reset the air restriction gauge 114 on gauge display 106.

Also on the panel 34 are two other gauge displays 108 and 110 which are dual purpose gauge displays.

The gauge display 106 has an analog display 112 for the exhaust temperature and an indicator lamp 114 for the air restriction pressure.

The air restriction pressure is a measure of vacuum level on the engine side of an air cleaner filter. A vacuum switch is mounted in the air flow just behind the air filter. Whenever the air flow drops below a designated fixed point, the vacuum switch closes to indicate a blocked air filter condition. This grounded input is fed to the panel 34 which lights the air restriction indicator lamp 114. In other words, whenever the vacuum switch reaches its set point, it closes and turns on the indicator lamp 114.

A service warning and flashing display will occur when an air restriction sensor indicates too much air filter restriction.

Then the gauge display 108 has an analog display 116 for engine oil temperature and an analog display 118 for transmission oil temperature. The engine oil temperature display 116 is an analog display 116 with 16 segments and has a display range from 100 degrees F. to 320 degrees F.

The transmission oil temperature display 118 likewise has 16 segments and displays temperatures from 100 degrees F. to 320 degrees F.

Then the lower gauge display 110 has an analog display 120 for front axle oil temperature and an analog display 122 for the rear axle oil temperature.

The exhaust pyrometer display 112 is generated from a thermocouple sensor and will provide an analog display with 15 segments, between 0 degrees F. and 1500 degrees F.

Similarly, the front axle oil temperature and the rear axle oil temperature displays 120 and 122 are analog with 16 segments and have a display range of between 100 degrees F. and 320 degrees F.

The Warning/Alarm Parameters are as follows:

| Service | Flashing Gauge | Audio Alarm |
| --- | --- | --- |
| Air Restriction (Blocked Air Filter) | Oil Pressure | Oil Pressure |
| | Water Temperature | Water Temperature |
| | Pri Air Pressure | Pri Air Pressure |
| Preventative Maintenance (Mileage Level) | Sec Air Pressure | Sec Air Pressure |
| | Battery Voltage | Engine Shutdown |
| | Engine Shutdown | |
| Bad Sensor | Bad Sensor | |

The primary and secondary instrumentation gauge modules 12 and 18 have an operating mode which allows certain changeable parameters to be altered. To enter this mode, first one turns off the ignition. Then one holds buttons 74, 101–103 down and turns an ignition on. Then a security code has to be entered to initiate a change sequence. The changeable parameters include:

| LEVEL | PARAMETER DESCRIPTION |
| --- | --- |
| 0. | Entry/Exit of this mode is done here. |
| 1–4. | Incremental mileage service indicator (4 levels); the "service" LCD is lit upon reaching an absolute mileage level. |
| 5. | Tachometer flywheel teeth. |
| 6. | Speedometer pulses per mile. |
| 7. | Tachometer over rev rpm limit. |
| 8. | Low oil pressure serial # to indicate warning limits and engine shutdown limits. (Serial # chooses pre-defined limits found in a lookup table.) |
| 9. | High water temperature serial # to indicate limits. |
| 10. | Odometer preset mileage. Alterable ONLY upwards with an upward limit of |

-continued

| LEVEL | PARAMETER DESCRIPTION |
| --- | --- |
| 11. | Key code to clear "service" LCD. |

All of the parameter level numbers shown above will actually be displayed on the digital speedometer display 64 (the LCD's therefor causing the parameter level to be indicated).

When entering the programming mode, the first digit area in the digital display 64 will show a 0.

To go on to other changeable parameter levels, a six digit security code must be entered before pressing a PARAMETER LEVEL button 101 (which will be the multigauge button 101 when the programming mode has been set by depressing all four buttons 74, 101–103). The PARAMETER LEVEL button 101 will change the display to the next changeable parameter. After making the desirable changes on each parameter level (if any), one pushes the PARAMETER LEVEL button 101 until level 0 is displayed again. Once level 0 is displayed, a combination of the four buttons 74, 101–103 must be depressed to leave the diagnostic programming mode. When this mode is left, the cluster will continue with the 3 second lamp test and normal operation.

In the programming mode, the four buttons 74, 101–103 have different meanings than when in the normal operating mode. The meanings are shown below:

| NORMAL OPERATING MODE | PROGRAMMING MODE |
| --- | --- |
| duplex gauge 74 | PARAMETER LEVEL |
| odo/trip odo 101 | NEXT DIGIT |
| trip odo reset 102 | UP DIGIT |
| air restrict reset 103 | DOWN DIGIT |

A description of the programming mode keys or buttons when the second instrumentation gauge module 18 is being operated in a programming mode is as follows:

| PARAMETER LEVEL | Cycles through the different parameters. |
| --- | --- |
| NEXT DIGIT | Selects the next digit to the left to be altered and shows digit selection by a flashing digit. |
| UP DIGIT | Increments the flashing digit by one and wraps around to zero |
| DOWN DIGIT | Decrements the flashing digit by one and wraps around. |

An example of use of the programming mode using entry key code 102938 to effect a so-called level 6 value change from 12345 to 54321 is as follows:

(1) Depress the four buttons 74, 101–103 simultaneously.

(2) Turn the ignition on. The digital speedometer display will now display a 0. The odometer will display 000000 with the last digit blinking.

(3) Push the DOWN button 103 twice. The odometer will now display 000008.

(4) Push the NEXT button 101. The digit to the left of the 8 will blink.

(5) Push the UP button 102 three times. The odometer will now display 000038.

(6) Push the NEXT button 101. The digit to the left of the 3 will blink.

(7) Push the DOWN button 103 once. The odometer will now display 000938.

(8) Push the NEXT button 101. The digit to the left of the 9 will blink.

(9) Push the UP button 102 twice. The odometer will now display 002938.

(10) Push the NEXT button 101 twice. The digit to the left of the 9 will blink.

(11) Push the UP button 102 once. The odometer will now display 102938. Since the key code is correct, the PARAMETER LEVEL button will now advance the display to level 1.

(12) Push the PARAMETER LEVEL button 74 six times. The digital speedometer display will now display a 6. The odometer will display a 12345.

(13) Push the DOWN button 103 four times. The odometer will now display a 12341.

(14) Push the NEXT button 101. The 4 will blink.

(15) Push the DOWN button 103 two times. The odometer will display a 12321.

(16) push the NEXT button 101 two times. The 2 on the left will blink.

(17) Push the UP button 102 two times. The odometer
will display a 14321.

(18) Push the NEXT button 101 once. The 1 on the left
will blink.

(19) Push the UP button 102 four times. The odometer
will display a 54321.

(20) Push the NEXT button 101 six times. The digital speedometer will display a 0.

(21) Push all four buttons 74, 101–103 simultaneously to exit.

At this point, all of the parameters that have been altered are stored in a non-volatile memory which will be described in greater detail hereinafter. The system will now continue with the 3 second lamp test and then with normal operation.

Figure 5:
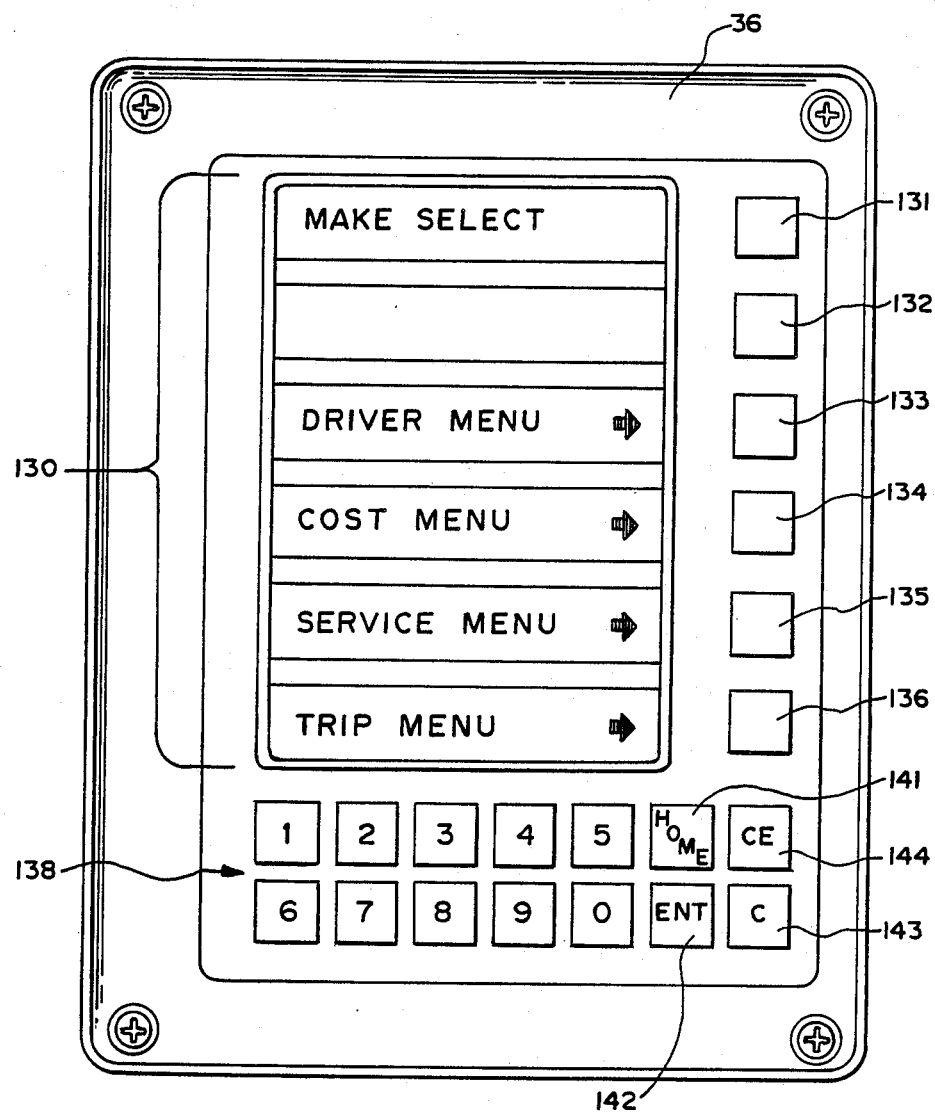
FIG. 5 is a front plan view of the driver interface module.
Figure 6:
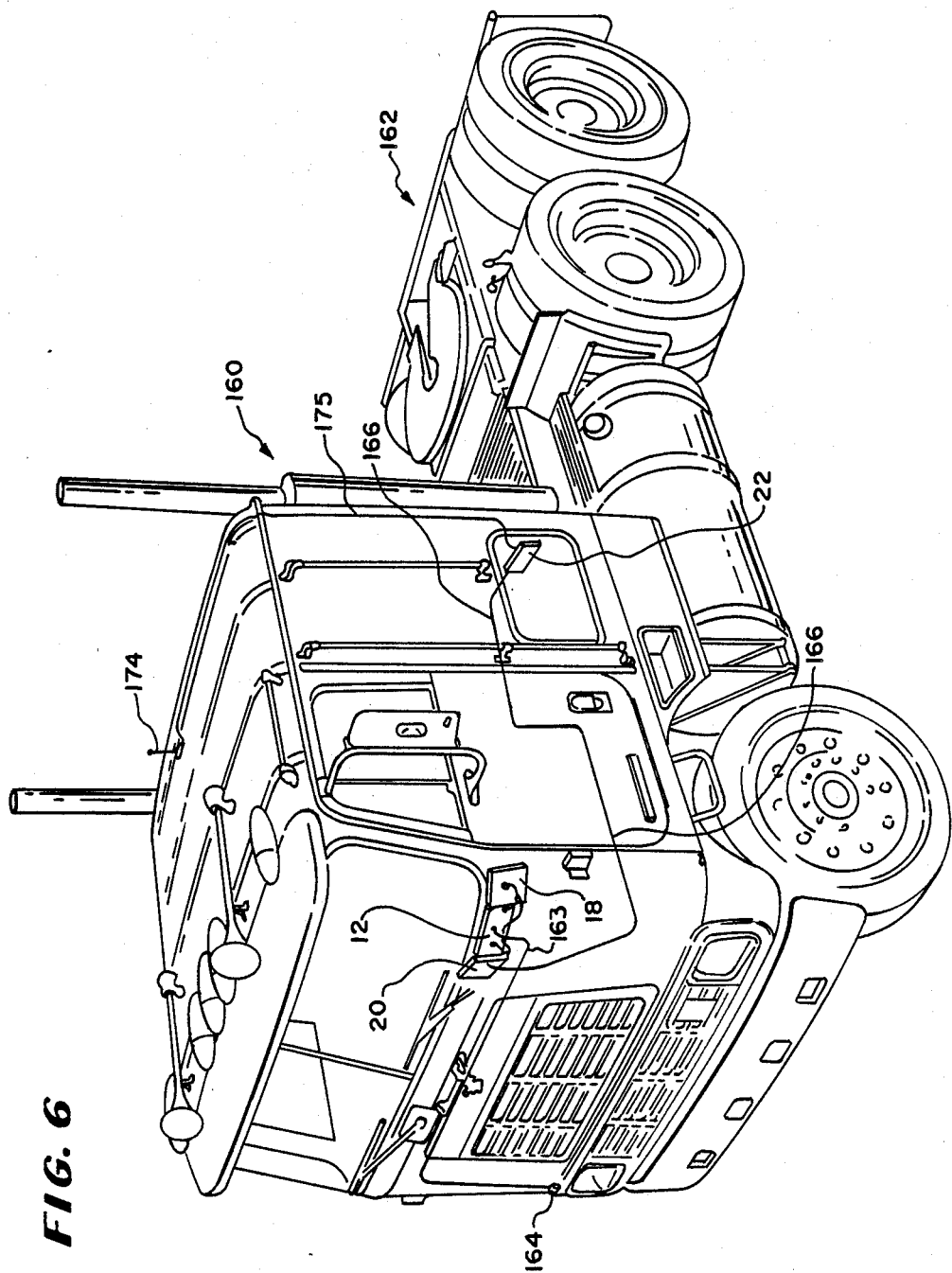
FIG. 6 is a perspective view of a truck cab and chassis and shows the position of several truck operation monitoring system modules of the truck operation monitoring system and their interconnection.

Referring now to FIG. 5, the driver interface panel 36 has a Visual display 130 which can show a number of different items or menus. In the illustrated embodiment, there is shown a driver menu, a cost menu, a service menu and a trip menu.

It is to be noted other menus can be displayed and they will be determined by the various data to be input into the driver interface module 20. These menus can be called up by depressing one of the menu select buttons 131–136.

Also on the driver interface panel 36 is a keyboard 138 comprising 10 digit keys or buttons 0–9, and four specific function keys or buttons 141–144.

The button 141 is a HOME button for bringing the operator to the top level of the menu, e.g. the first screen of the menu. The button 142 is an entry button. The button 143 is a clear button for clearing the last digit entered and button 144 is a clear entry button for clearing the entry.

The driver interface module 20 and the recorder 21 will include a microprocessor such as a Motorola MC 68000 microprocessor and a dynamic memory or DRAM - having a maximum of 256K ROM for program storage, 64K SRAM for static data storage and normal RAM and 8K EEPROM for long-term critical data storage. This memory includes a data log which is a collection of the operating parameters of the truck over a long period of time such as, for example, two weeks. This data is collected and stored in the battery backed memory.

The data that is collected and stored or entered can be summarized as follows:

SPEED VS. RPM RECORDING: The vehicle speed and engine RPM will be sampled once each second and stored as the total time spent in various speed/rpm ranges. These ranges are not changeable in the recorder, but report software can be adjusted to meet users needs.

WARNING/OCCURRENCE RECORDING: Warnings and occurrences happen when either a switch is activated (as in engine coolant level) or a vehicle parameter is out of range (as when air pressure is too low). For each parameter, the time at which the event first happened is logged, the last time at which the parameter was out of range is logged, the total time the parameter was out of range is logged, and the number of times the warning condition occurred is logged. The following vehicle parameters are monitored in this fashion:

1. Engine Shut Down
2. Power Divider Lock
3. Engine Coolant Level
4. Axle Anti-Lock
5. Engine Coolant Temp
6. Engine Oil Temp
7. Transmission Oil Temp
8. FR Axle Temp
9. RR Axle Temp
10. Engine Oil Pressure
11. Battery Voltage
12. Air Filter Restriction
13. Primary Air Pressure
14. Secondary Air Pressure
15. Exhaust Gas Temp PEAK VALUE RECORDING: A peak value is the highest (or lowest) reading obtained on a given vehicle parameter. For each parameter following, the peak value is recorded along with its time of occurrence.

| PARAMETER | VALUE |
|---|---|
| 1. Speed | HIGH |
| 2. RPM | HIGH |
| 3. Primary Air Pressure | LOW |
| 4. Secondary Air Pressure | LOW |
| 5. Engine-Oil Pressure | LOW |
| 6. Battery Voltage | HIGH |
| 7. Engine Coolant Temp | HIGH |
| 8. FR Axle Temp | HIGH |
| 9. RR Axle Temp | HIGH |
| 10. Transmission Oil Temp | HIGH |
| 11. Engine Oil Temp | HIGH |

EVENT RECORDING: Events are recorded so that information about the trip (miles travelled, time of trip, idle time, etc.) can be obtained. There are four events to be recorded: ENGINE START, VEHICLE START MOVING, VEHICLE STOP MOVING, and ENGINE STOP. For each event recorded, its type is saved, and the current time and odometer reading are saved. Now with respect to the driver interface module 20 and recorder 21, the following information can be entered into the memory:

TRIP COMPUTER: The Trip Computer is a group of related functions which give the driver some helpful information about the trip. Fuel information can be accumulated provided a fuel-flow meter is provided.

MILES PER GALLON: Instantaneous and average fuel consumption.

REMAINING FUEL: Amount of fuel remaining.

ESTIMATED TIME OF ARRIVAL: ETA calculated based on average speed and remaining distance to destination.

ELAPSED TIME: Resettable elapsed timer.

DISTANCE TRAVELLED: Distance travelled since beginning of trip.

DISTANCE TO DESTINATION: Driver can enter the distance to his destination first, and then see the distance remaining to the end of the trip.

DRIVER INFORMATION FUNCTIONS: These functions give information about the driver.

Additionally, driver information can be inserted such as:

DRIVER ID NUMBER: The driver can enter his ID number, and the time and miles at which he does will be recorded.

DRIVER LOG: Allows the driver to enter his current status (OFF-DUTY, ON-DUTY, DRIVING, SLEEPER) as per the DOT standards. The time and odometer will be stored, and the driver will be asked to enter a location code at this time.

FUEL COSTS: The driver can enter the fuel amount in gallons or liters, and the fuel cost in dollars.

OIL COSTS: The driver can enter the cost of an oil purchase.

TOLL COSTS: The driver can enter the toll road number, enter the toll cost, view the current toll road he is on, or change the toll road number. When a toll road is entered or changed, the time, miles, and current state are saved.

MAINTENANCE COSTS: The driver can enter a code number indicating the type of service performed, and the cost of the service in dollars.

FOOD COSTS: The driver can enter the cost of food purchases in dollars.

LODGING COSTS: The driver can enter the cost for lodging.

PHONE COSTS: The driver can enter the cost of telephone calls.

PERMIT COSTS: The driver can enter the cost of permits required while on the road.

WASH AND WEIGH COSTS: The driver can enter the cost of washes and weighs incurred during the trip.

MISCELLANEOUS COSTS: The driver can enter the cost of any other item by entering a fleet defined cost code, and the dollar amount of the purchase.

LOADS: Another menu that can be provided is information regarding the load that the driver is hauling. This information can include the following:

CUSTOMER CODE: The driver can enter a fleet defined customer code.

PICKUP POINT: The driver can enter the point at which a load was picked up. The time, odometer reading, and location will be recorded.

DROP POINT: The driver can enter the point at which a load was dropped. The time, odometer reading, and location will be recorded.

GROSS WEIGHT: The driver can enter the gross weight of the load in pounds.

TRAILER NUMBER: The driver can enter the trailer numbers for one or two trailers he is pulling.

TERMINAL NUMBER: To be determined by user.

ROUTE INFORMATION: These functions allow the driver to enter information about where he b currently is along a trip route.

STATE LINE CROSSING: The driver can enter the new state or province he is crossing into, and the time and odometer reading will be saved.

LOCATION CODE: The driver can enter a fleet defined location code, and the time and odometer reading will be saved.

ROAD CONDITION: The driver can enter the driving condition of the current road he is travelling (wet, snow covered, icy, clear, construction). The time and miles will be recorded.

The circuitry for the modules 12, 18, 20 and 21 will be described in greater detail below in connection with the description of FIGS. 9-11. Turning now to FIG. 6, there is illustrated therein, a perspective view of a truck cab generally identified by reference numeral 160 mounted on a perspective view of the cab chassis generally identified by reference numeral 162. Also, there is shown in solid lines, the back side of the truck operation monitoring system modules 12, 18 and 20. A primary wiring harness 163 extends from the back of the module 12 to connectors generally identified by reference numeral 164 which connect with various sensors as will be described in greater detail hereinafter. The recorder module 21 in the module 20 is connected by a cable 166 to the RF link 22 which is an RF transmitter 22 for offloading of data accumulated in the recorder via radio waves transmitted from antennae 174 mounted on top of the cab 160 and connected to the transmitter 22 by a cable 175.

Figure 7:
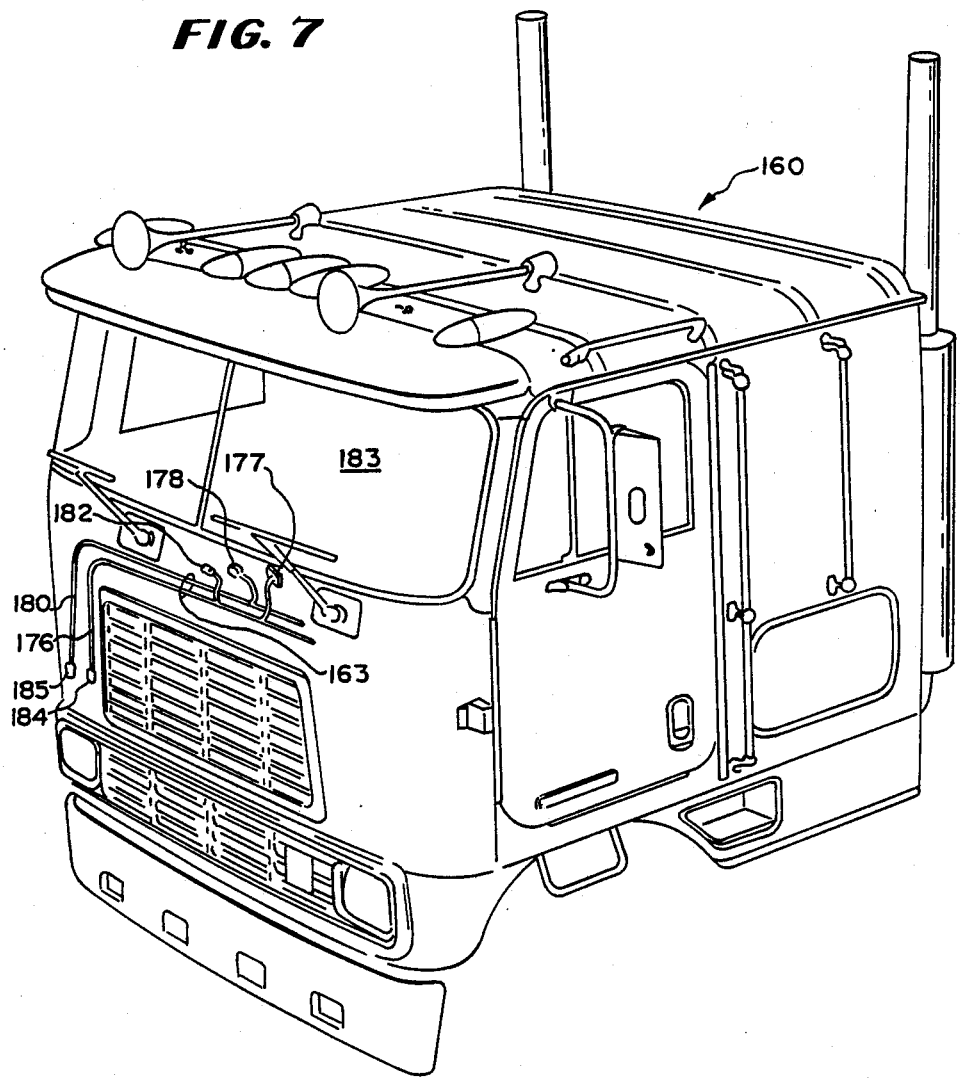
FIG. 7 is a perspective view of a truck cab similar to the view shown in FIG. 6 and shows several connections to sensors.

In FIG. 7 is illustrated the harness 163 which includes a primary cab harness 176 that is connected to an air restriction sensor 177 and a primary air pressure sensor 178. Also shown is a secondary cab harness 180 which has a secondary air pressure sensor 182 connected thereto. As shown, the primary and secondary air pressure sensors 178 and 182, as well as the air restriction sensor 177, are mounted on the front of the cab 160 beneath a cab windshield 183.

As shown, the cab harnesses 176 and 180 have connectors 184 and 185 at respective lower ends thereof for connecting the harnesses 176 and 180 to other means.

Figure 8:
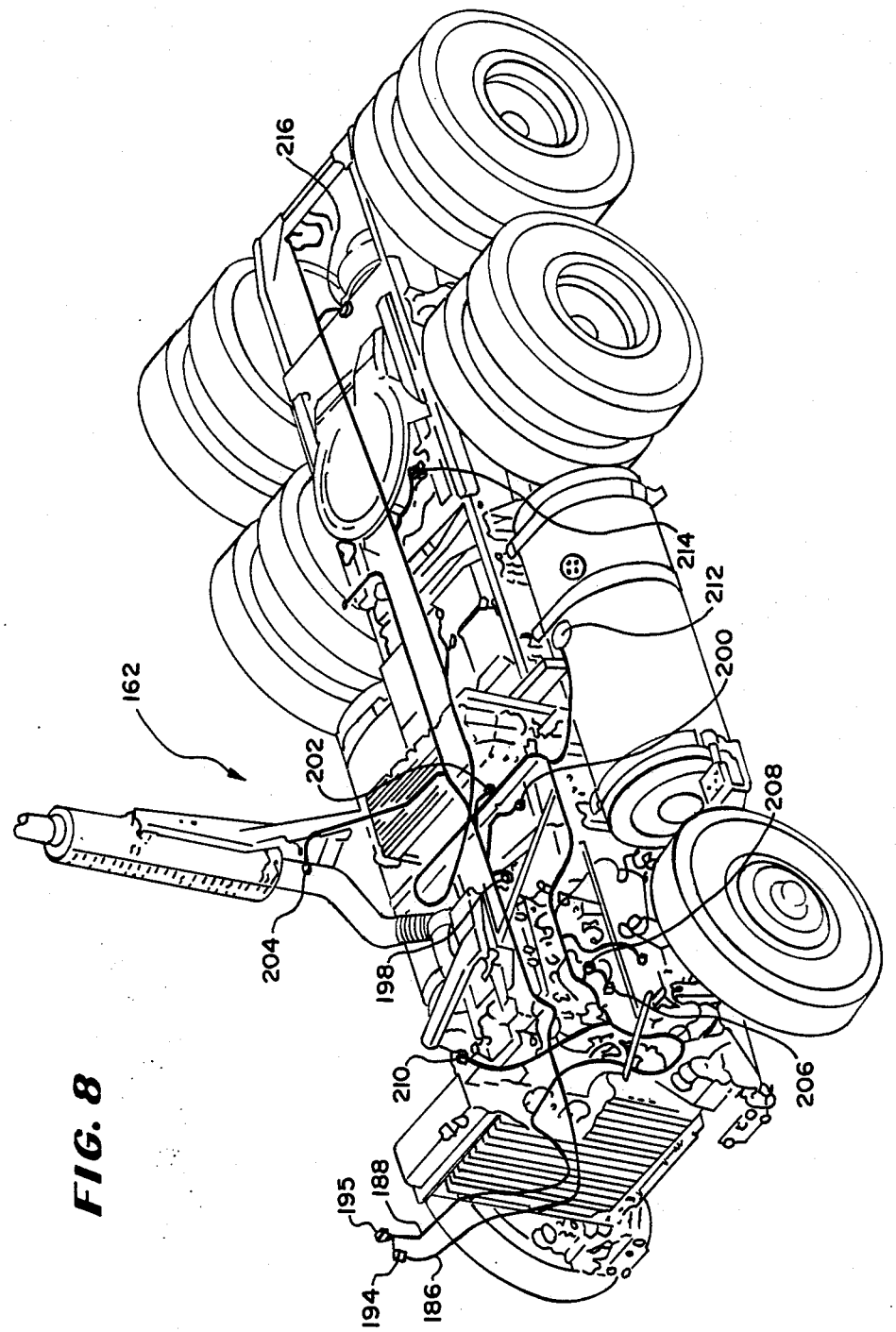
FIG. 8 is a perspective view of the chassis of the truck and shows the various sensors that are mounted to the chassis and the line connection of those sensors to a connector which is adapted to be connected to the truck operation monitoring system modules.

Referring now to FIG. 8, there is illustrated therein the chassis 162 with the cab 160 removed therefrom and with an engine-to-cab wire harness 186 and a chassis-to-cab wire harness 188. The engine-to-cab wire harness 186 has a connector 194 at one end thereof which extends upwardly in the front of the cab 160 for connection to the primary cab harness connector 184. Likewise, the chassis-to-cab harness 188 has a connector 195 at one end thereof which is adapted to connect with the connector 185 at the end of the secondary cab harness 180.

As shown, the engine-to-cab harness 186 has connected thereto a tachometer sensor 198, a transmission oil temperature sensor 200, a speedometer sensor 202 and an exhaust pyrometer sensor 204.

Then, the chassis-to-cab harness 188 has connected thereto an engine oil pressure sensor 206, an engine oil temperature sensor 208, and an engine water temperature sensor 210, a fuel level sensor 212, a front axle oil temperature sensor 214 and a rear axle oil temperature sensor 216.

Figure 9:
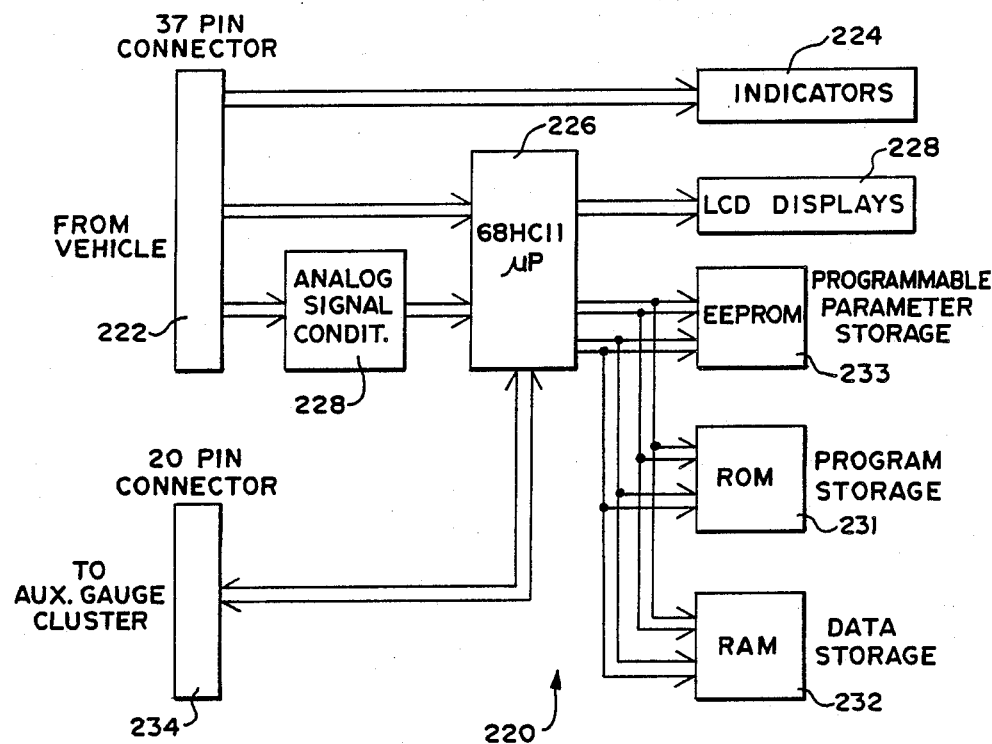
FIG. 9 is a block schematic diagram of the electrical circuit for the primary gauge instrumentation cluster module.

Referring now to FIG. 9, there is illustrated therein a schematic circuit diagram for the electrical circuit for the primary instrumentation gauge cluster module 12.

This circuit is generally identified by reference numeral 220 and includes a 37 pin connector 222 which is adapted to connect with various ones of the wire conductors in the wiring harness 163 that connect to the various visual sensors described above. Certain ones of the pins of the connector 37 are then connected to indicator lamps generally identified by reference numeral 224 and for lighting up various ones of the indicator displays 41–49 on the display area 38 in FIG. 3.

Certain of the pins are connected directly to a microprocessor 226 and others are connected through an analog signal conditioning circuit 228 to the microprocessor 226.

The microprocessor 226 has outputs to LCD displays 228 for providing the various digital and analog displays described above on the panels 32 (FIG. 3) and 34 (FIG. 4). Also connected to the microprocessor 226 is the battery backed up memory comprising a ROM 231, a RAM 232 and an EEPROM 233. The memories 231, 232 and 233 can be incorporated into a Motorola 68HC11 microprocessor.

Also, the microprocessor 226 is coupled to the auxiliary gauge instrumentation cluster through a 20 pin connector 234. As shown, the microprocessor 226 can be a Motorola 68HC11 microprocessor.

Figure 10:
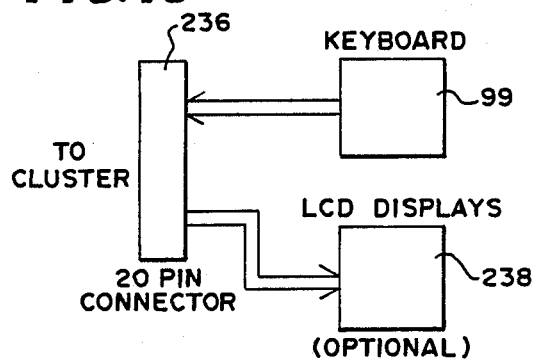
FIG. 10 is a block schematic diagram of the electrical circuit for the secondary gauge instrumentation cluster module.

Turning now to FIG. 10, a mating 20 pin connector 236 in the secondary instrumentation gauge cluster module 18 couples with the connector 234 and has coupled thereto the keyboard 99 and LCD displays 238 for the gauges 106, 108 and 110 on the panel 34 shown in FIG. 4.

Figure 11:
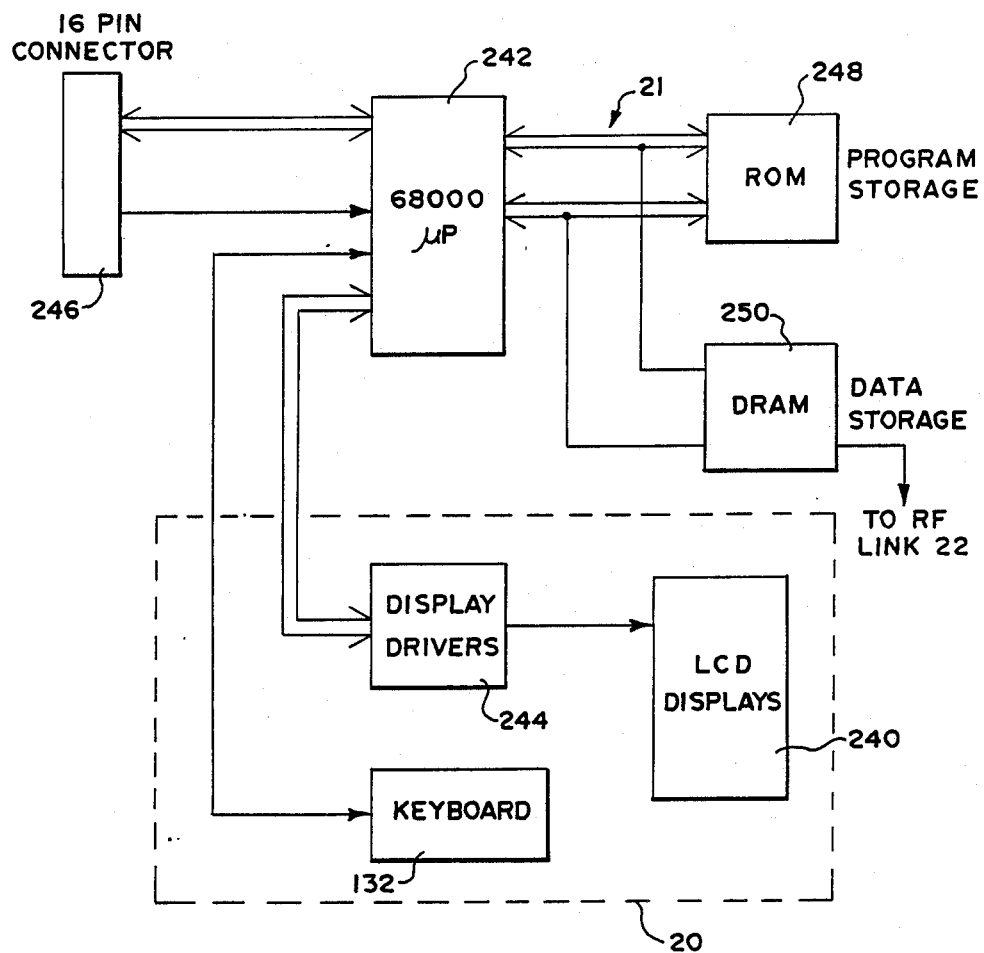
FIG. 11 is a block schematic diagram of the electrical circuit for the driver interface module and the recorder module.

Referring now to FIG. 11, there is illustrated therein a schematic electrical circuit diagram for the electrical circuit for the driver interface module 20 and the recorder module 21 which are interconnected and form part of each other.

In this respect, the driver interface module 20 includes the keyboard 132, LCD displays 240 for the visual display 130 and display drivers 244 which are coupled between a microprocessor 242 in the recorder module 21 and the LCD display 240.

The recorder 21 includes a 16 pin connector 246 by which it is coupled to the primary instrumentation gauge cluster module 12. Also, the recorder 21 includes a program storage ROM 248 and a data storage DRAM 250.

In FIGS. 12A–28 are set forth the flow charts of the routines or protocols carried out by the microprocessor 226 in effectuating the monitoring of various truck operating parameters, storing data relative to these parameters and enabling a driver to interface with the microprocessor to call up information or to store information which then can be offloaded via the RF link 22 or the serial interface ports 14 to the serial interface bus 16 to a larger data processing apparatus. More specifically, the protocol carried out by the microprocessor 226 for operation of the primary gauge instrumentation module 12 is set forth in FIGS. 12A–16.

Figure 12A:
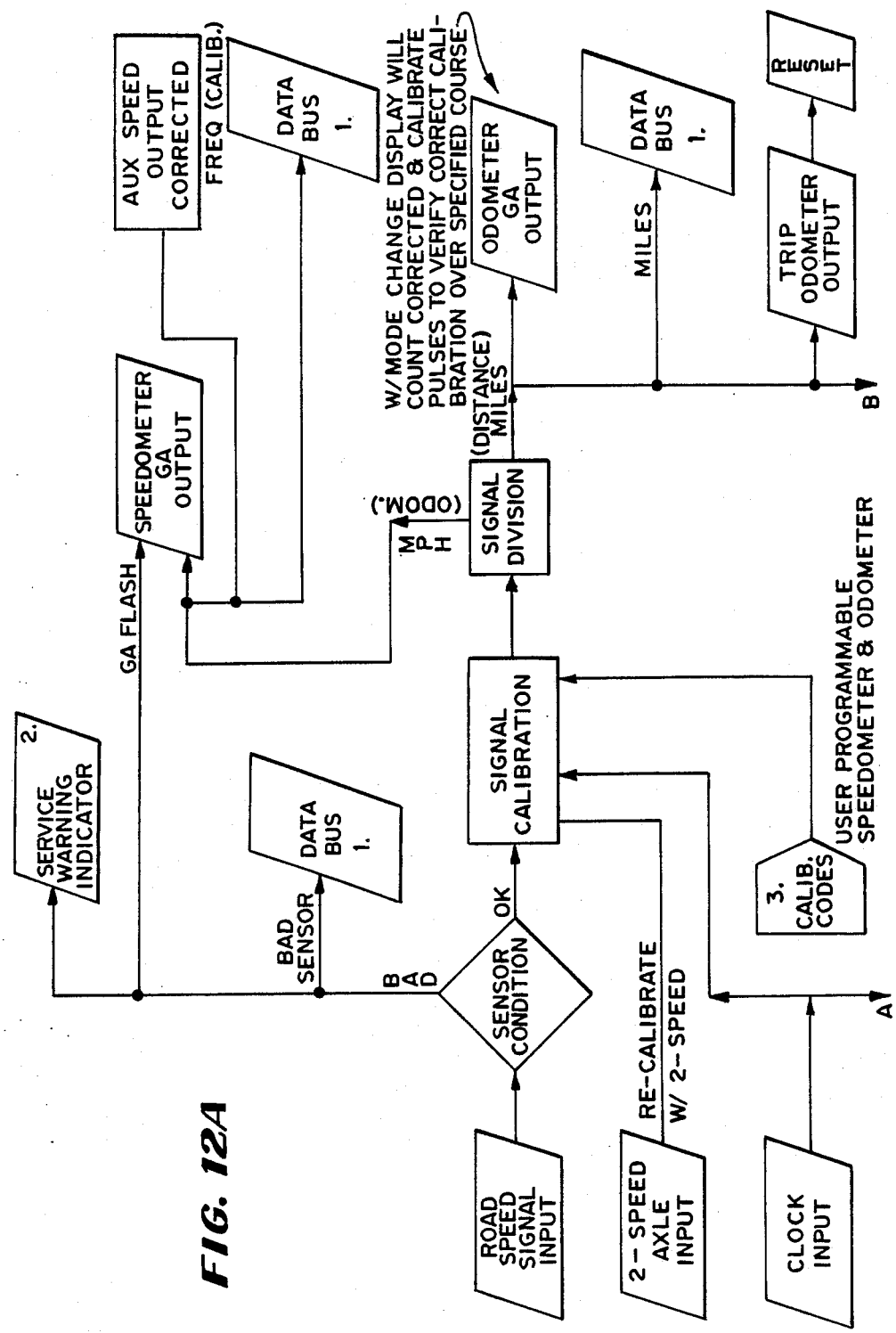
FIGS. 12A-16B are flow charts of the routine or protocol carried out by the microprocessor in the primary gauge instrumentation module shown in FIG. 3.
Figure 12B:
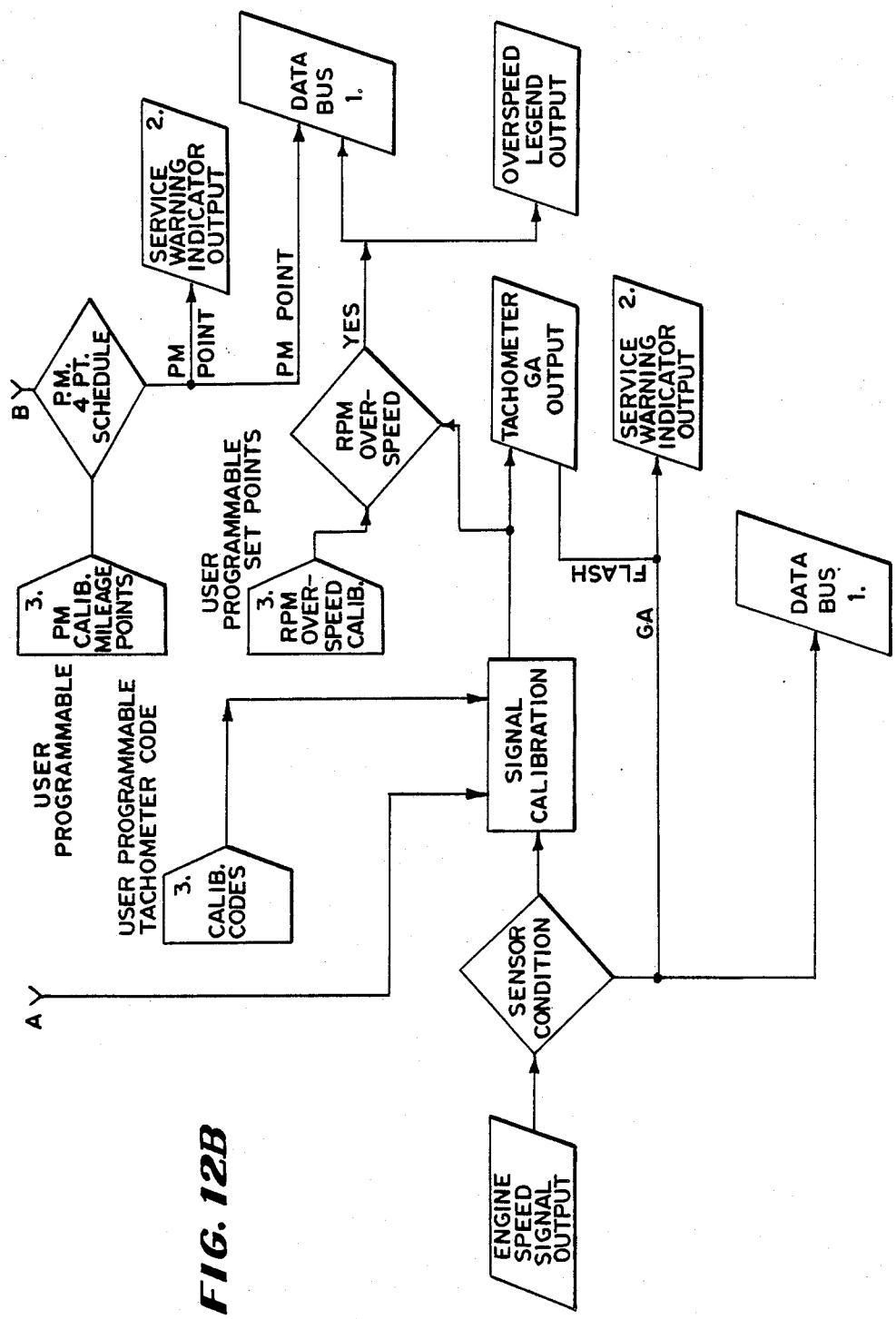

With particular reference to FIGS. 12A and 12B, a plurality of inputs to the system are shown, namely a road speed signal input, a two speed axle input, a clock input, an engine speed signal input, an engine oil pressure input and an engine water temperature input.

Starting with the road speed signal input, first the condition of the sensor is evaluated.

If it is a bad sensor, that information is sent to a data bus, to a speedometer gauge flashing circuit and to a service warning indicator.

If it is okay, the signal is then processed in a calibration operation which also receives a clock input and the two speed axle input.

The signal calibration operation also utilizes user programmable speedometer and odometer calibration codes.

After the signal calibration operation is performed, a signal division operation is performed and a divided signal is supplied to an odometer gauge output.

Another divided signal is supplied to the speedometer gauge output, to an auxiliary speed output connection and to the data bus.

A distance-in-miles, divided signal is supplied to the odometer gauge output, a data bus and a trip odometer output.

Also, an interrogation operation is performed to see if programmable mileage points have been reached, such as for indicating when the engine should be serviced. At this decision point, mileage points programmed into the system by the user are compared with the mileage signal and, if there is a correlation, a service warning indicator output is actuated and the program mileage point is sent to the data bus.

The engine speed signal output is evaluated to see if the sensor is operating properly. If not, a signal is sent to the data bus, to a flashing circuit for a tachometer gauge output and to a service warning indicator output.

If it is okay, a signal calibration operation is performed using the input and the user programmable tachometer code. Then the calibrated signal is supplied to the tachometer and also a decision operation is performed to determine whether or not a user programmable rpm over speed limit has been reached. If yes, this information is Output to the data bus and to an over speed legend output.

Figure 13A:
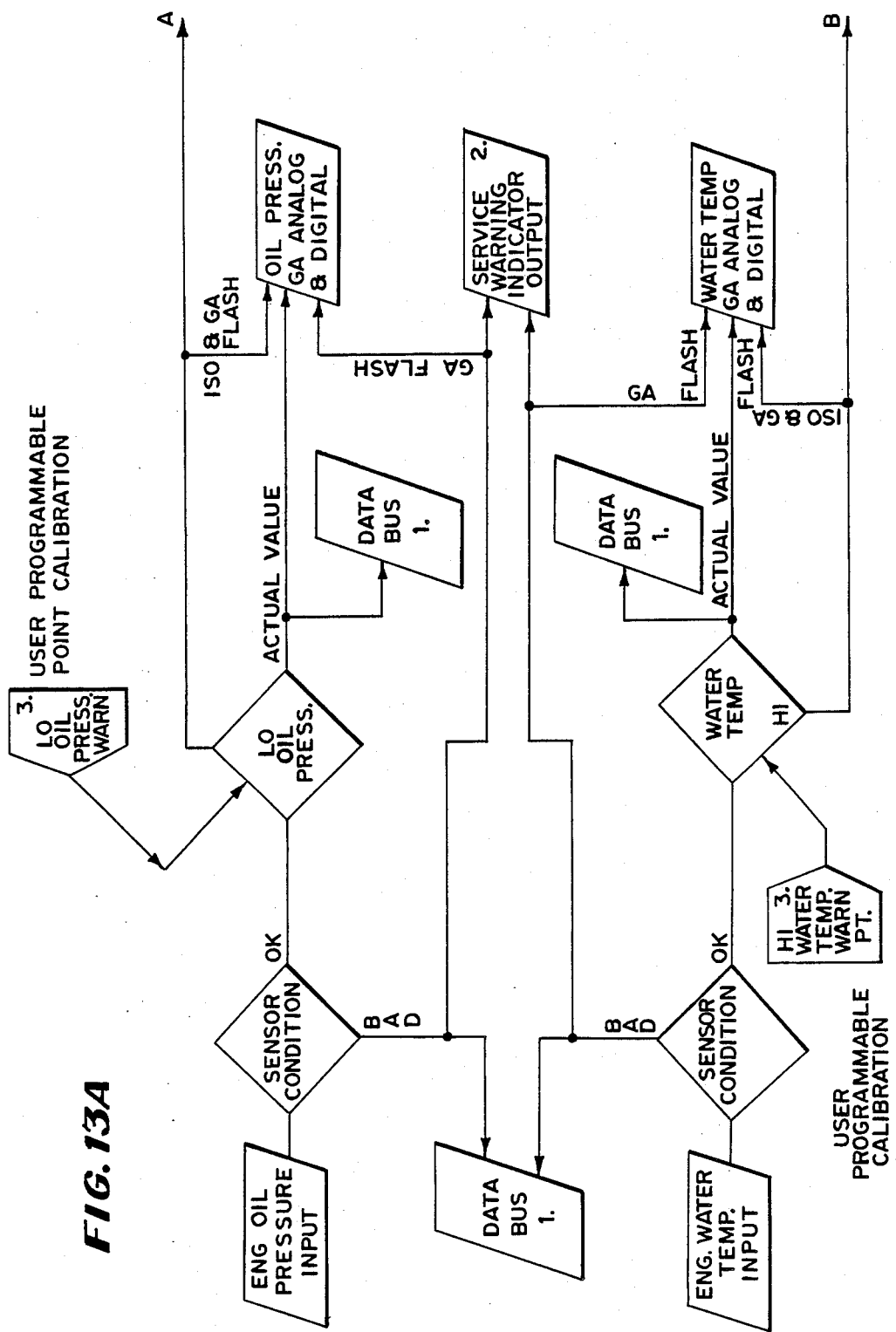
Figure 13B:
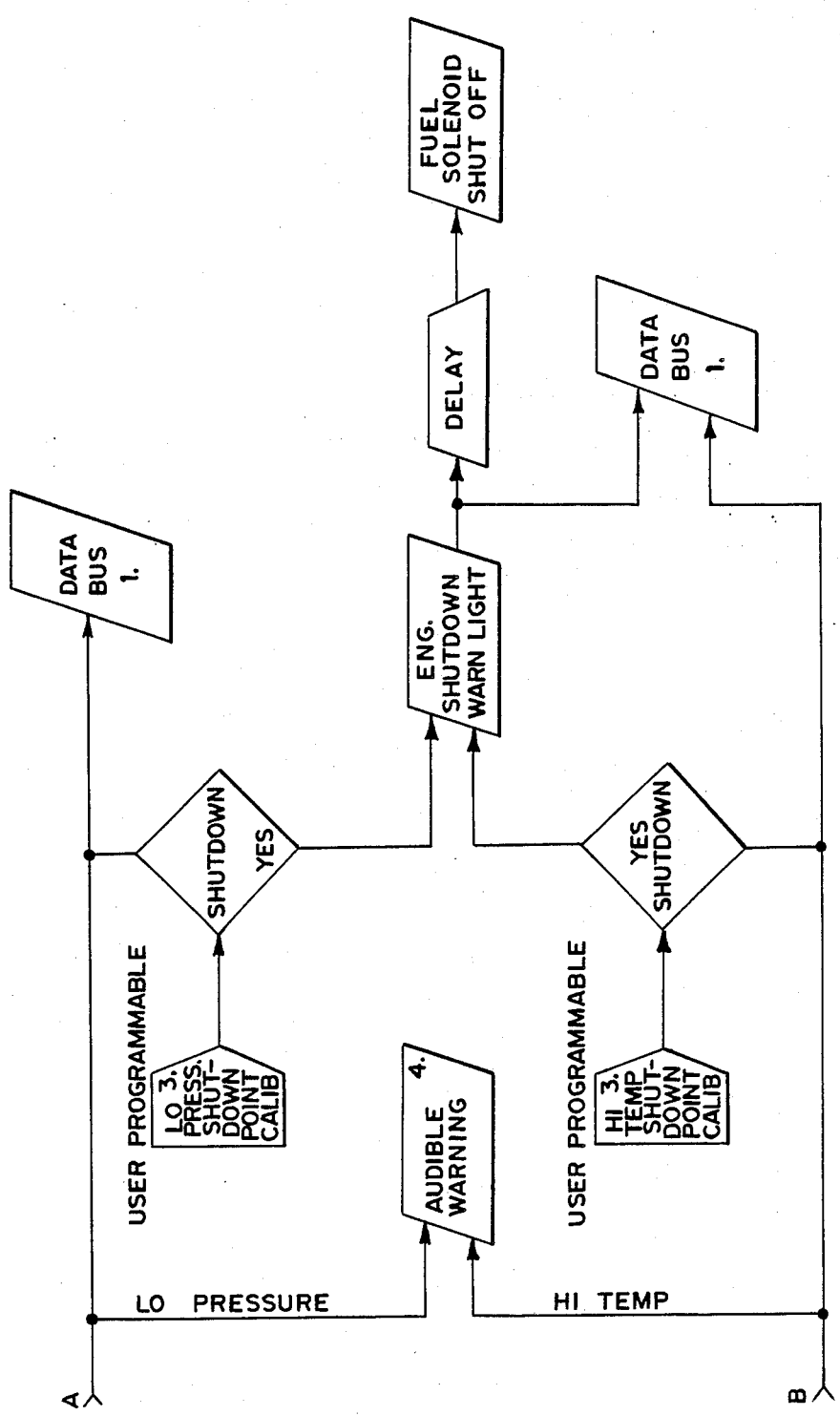

Referring now to FIGS. 13A and 13B, engine oil pressure and engine water temperature sensor signals are processed in this routine.

First of all, the engine oil pressure sensor condition is determined.

If it is bad, this information is supplied to the data bus, to a service warning indicator output and to a flashing circuit for the oil pressure gauge, analog and digital.

Likewise, if the sensor condition for the engine water temperature sensor is found to be bad, this information is supplied to the data bus, to the service warning indicator and to a flashing circuit for the water temperature gauge, analog and digital.

If the sensor signal for engine oil pressure is okay, a determination is made using user programmable low oil pressure calibration points to determine if the pressure is too low.

If it is, this information is supplied to the data bus and to a flashing circuit for the oil pressure gauge. Also, it is supplied to a low pressure audible warning circuit for causing an audible alarm.

Then a comparison is made with a user programmable low pressure shutdown pressure calibration to determine whether or not the engine should be shut down, and if so, then the engine shutdown warning light is turned on and a delayed signal is supplied to a fuel solenoid shutoff valve. If the engine oil pressure was within a proper pressure range, the actual value is supplied to the oil pressure gauge and to the data bus.

In a similar manner, the engine water temperature is compared with a user programmable high water temperature warning limit and if it is high it is compared with a user programmable high temperature shutdown point to determine whether the engine should be shut down. Also, this value is sent to the data bus.

If it is determined that the engine should be shut down, the engine shutdown warning light is actuated and then after a short delay the fuel solenoid is shut off.

If the water temperature was below the high water temperature warning point, then the actual value is supplied to the water temperature gauge and to the data bus.

Figure 14:
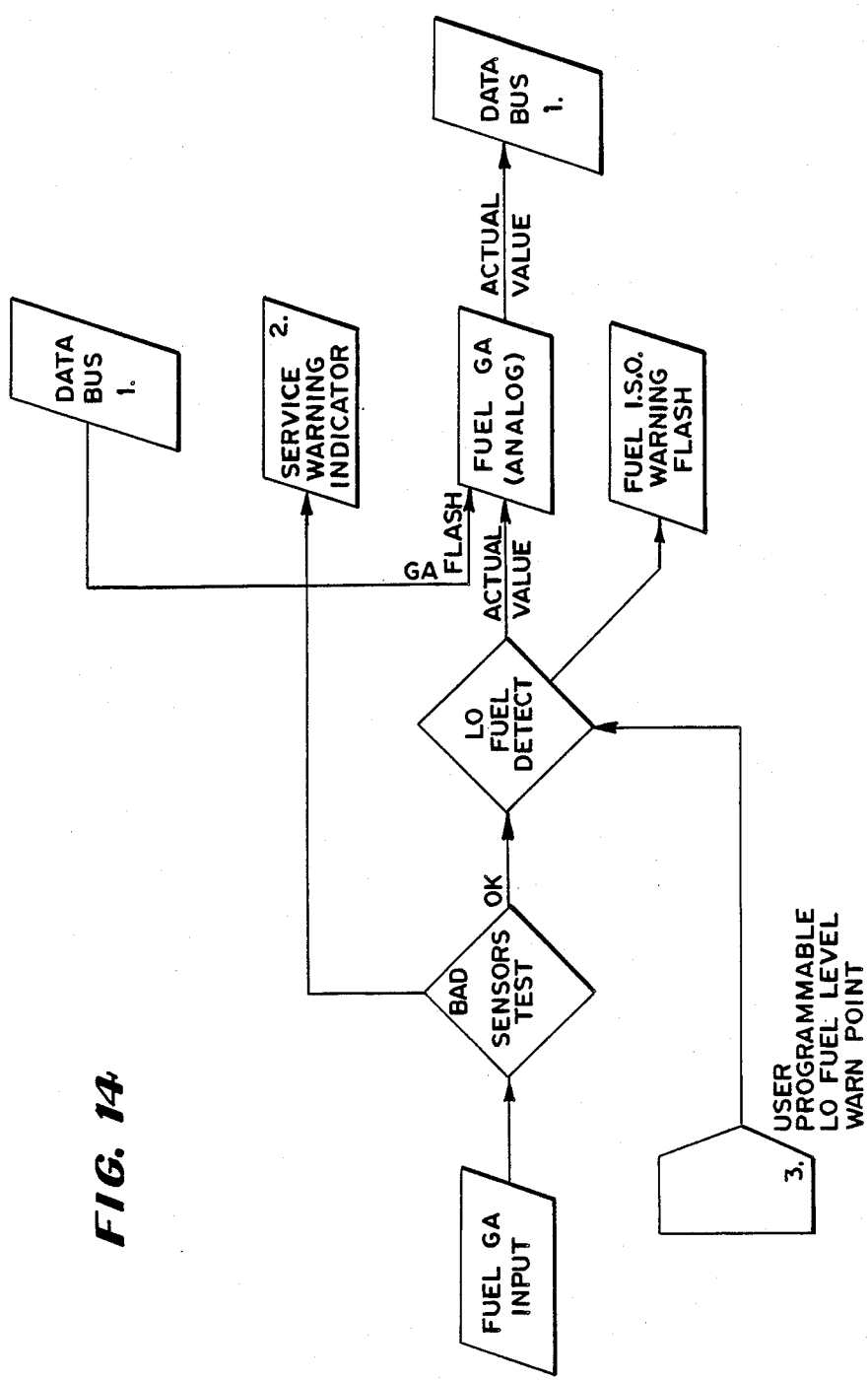

In FIG. 14 is shown the routine for checking on the fuel level. First of all, the fuel gauge input signal is checked to see if the sensor is bad.

If bad, this signal is sent to the data bus, to the service warning indicator and to a flashing circuit for the fuel gauge.

If it is okay, a determination is then made whether or not it is at or below the low fuel level warning point as determined by user programmable low fuel level.

If it is, a fuel warning flash is initiated such as by causing the image of a gas pump to appear on the fuel gauge.

In either event, the actual value is then supplied to the fuel gauge and to the data bus.

Figure 15:
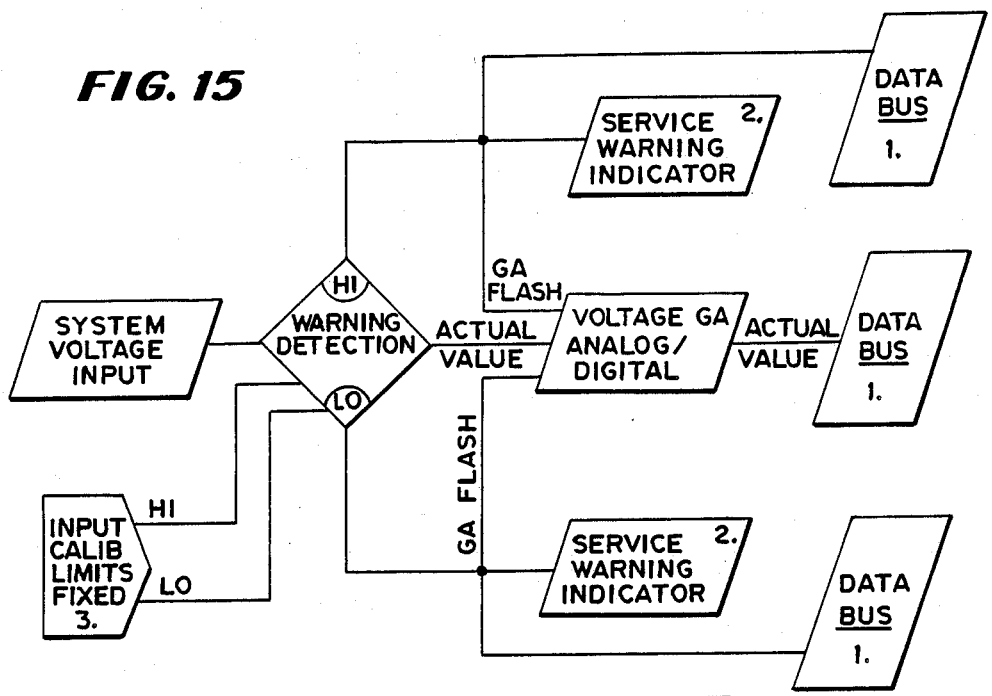

FIG. 15 shows the protocol for processing system voltage signals. First of all, the system voltage is compared with input calibration limits and if it is found that the voltage is outside these limits, a service warning indicator is operated and the information is sent to a data bus. Also, this signal is sent to a flashing circuit for the voltage gauge.

If the value of the voltage is within set limits, it is merely sent to the voltage gauge and displayed (or is available for display) and the actual value is supplied to the data bus.

Figure 16A:
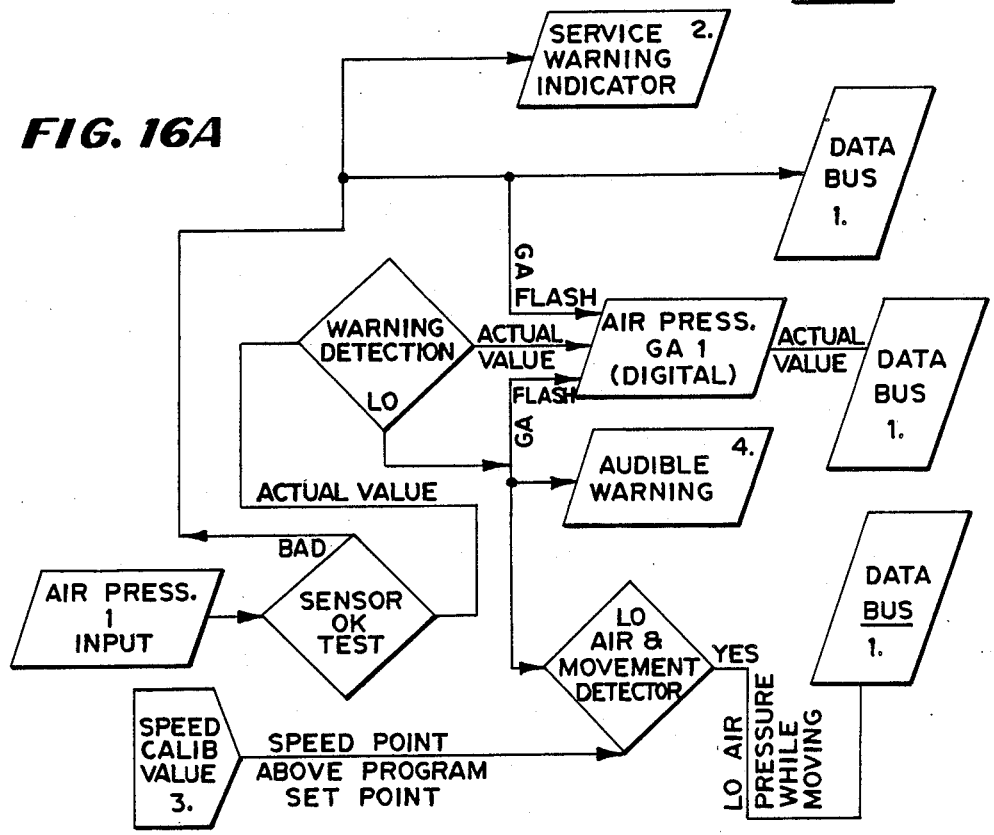
Figure 16B:
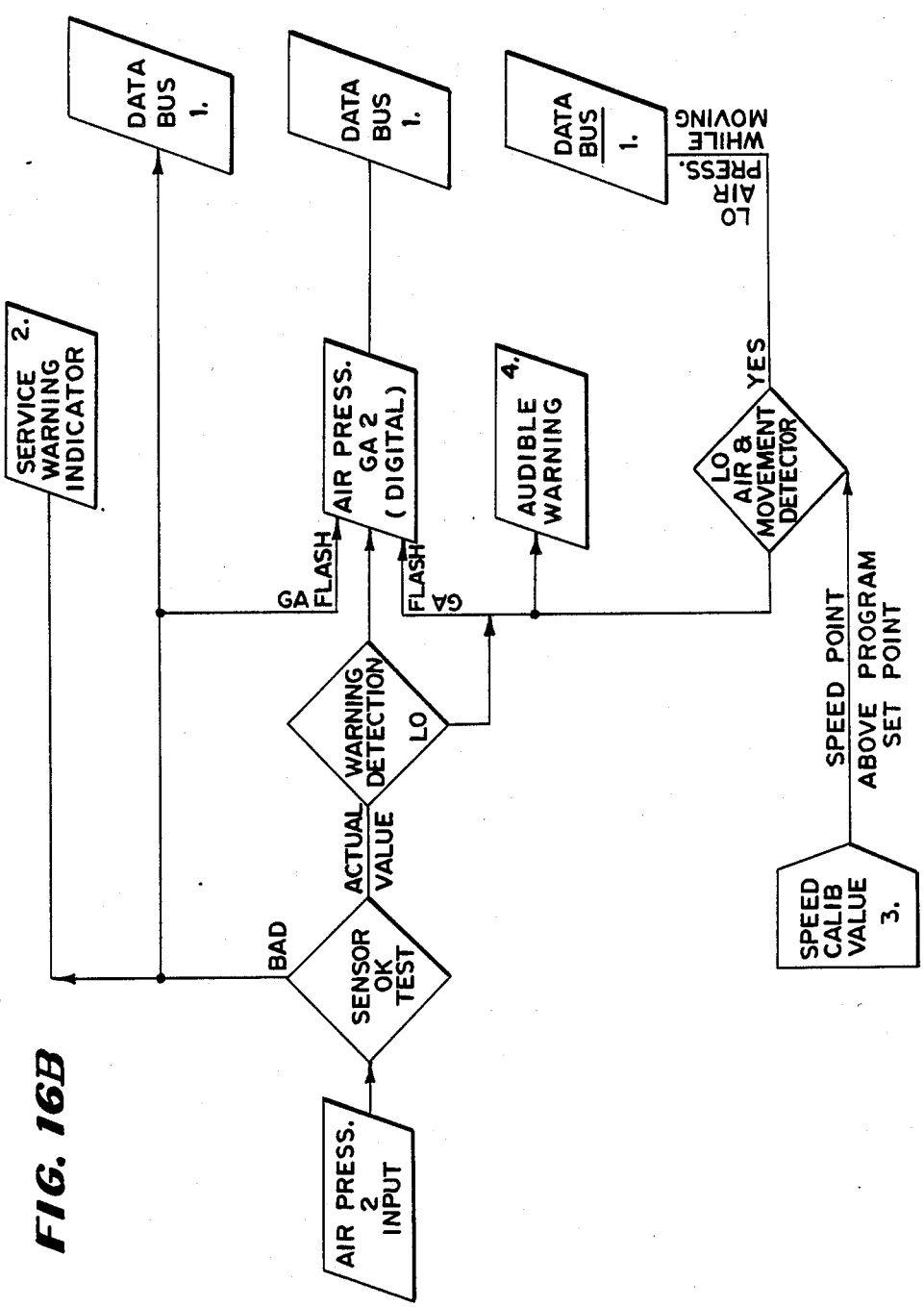

FIGS. 16A and 16B are essentially the same and illustrate the protocol for the first air pressure sensor and the second air pressure sensor.

In either case, the pressure sensed is evaluated to see if the sensor is okay.

If the sensor is not okay, a signal is sent to a service warning indicator, to the data bus and to a flashing circuit for the air pressure gauge 1 or 2.

Next, a determination is made whether the actual pressure value is too low. If it is too low, an audible warning circuit is actuated, the flashing circuit for the air pressure gauge is actuated and a determination is made whether there is movement of the vehicle as determined by a speed calibration value. If the vehicle is moving, a signal of lower-pressure-while-moving is supplied to the data bus.

As noted above, the same protocol or routine is carried out for the second air pressure sensor is shown in FIG. 16B.

FIGS. 17–22 illustrate the routines performed by the microprocessor 226 in conjunction with the secondary instrumentation gauge module 18.

Figure 17:
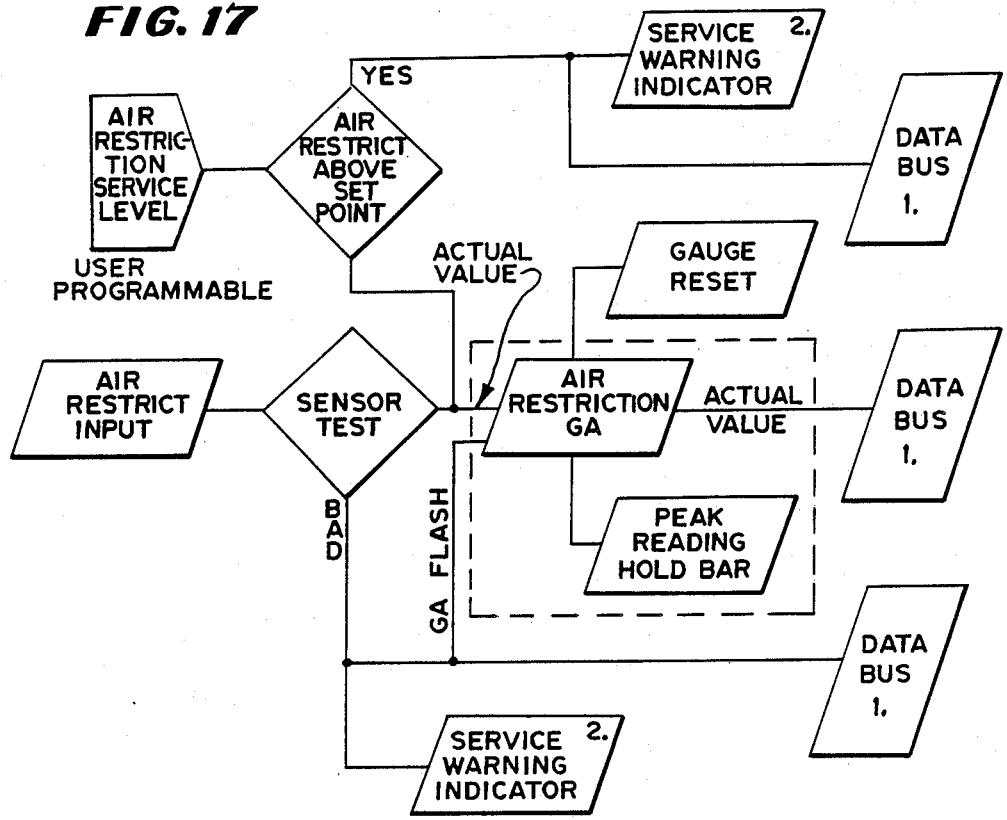
FIGS. 17-22 are flow charts of the routine or protocol carried out by the microprocessor in the primary module for the secondary gauge instrumentation module shown in FIG. 4.

Turning first to FIG. 17, the air restriction input signal is checked to see if the sensor is okay. If the sensor is not okay, a service warning indicator is actuated, the information is supplied to the data bus and a flashing circuit for the air restriction gauge is actuated. Alternatively, a switch and indicator can be provided.

If the sensor is okay, the actual value is supplied to the air restriction gauge and displayed and also supplied to the data bus. At the same time, this actual value is compared with an air restriction service level programmed by the user and if the air restriction is above a user programmed set point, a service warning indicator lamp is actuated and that information is supplied to the data bus.

Also, the air restriction gauge value is supplied to a peak reading holding bar which records a peak reading. A gauge reset switch is provided for cancelling out the peak reading being stored.

Figure 18:
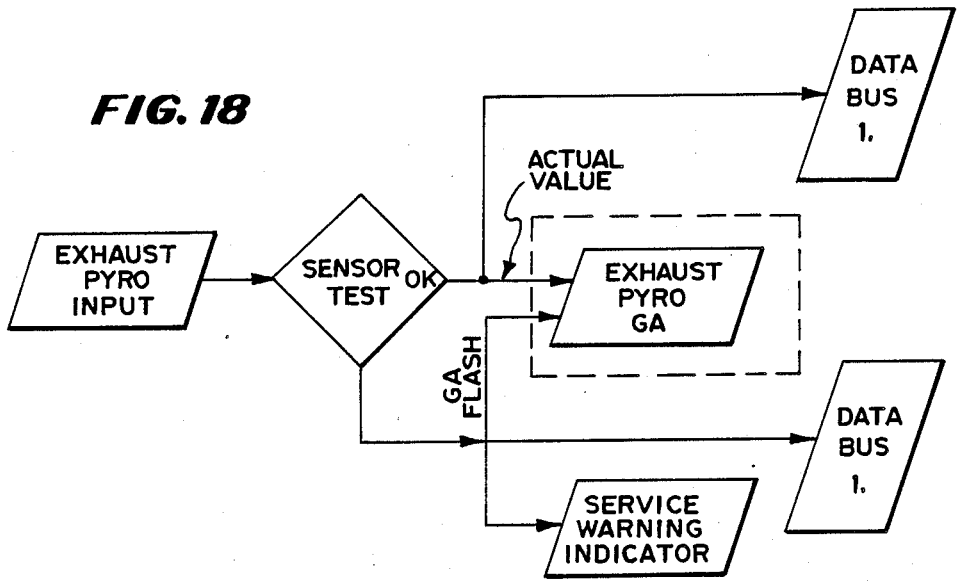
Figure 19:
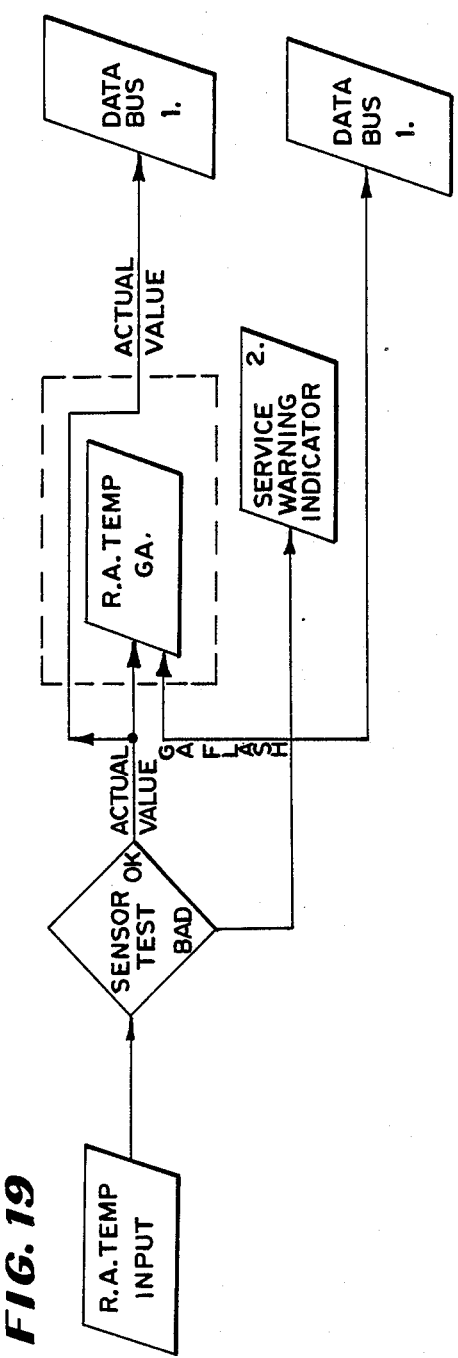

In FIG. 18 the exhaust pyrometer input signal is first checked to see if the sensor is bad.

If it is bad, this signal is supplied to a service warning indicator, to the data bus and to a flashing circuit for the exhaust pyrometer gauge.

If it is okay, the actual value is displayed on the exhaust pyrometer gauge and the value is supplied to the data bus.

In FIGS. 19–22 various temperature inputs are processed. In this respect, in FIG. 19 the rear axle oil temperature input signal is checked to see if the sensor is bad.

If it is bad, a service warning indicator is operated, the bad sensor signal is supplied to the data bus and to a gauge flashing circuit for the rear axle oil temperature gauge.

If the sensor is okay, the actual value is displayed on the rear axle oil temperature gauge and also supplied to the data bus.

Figure 20:
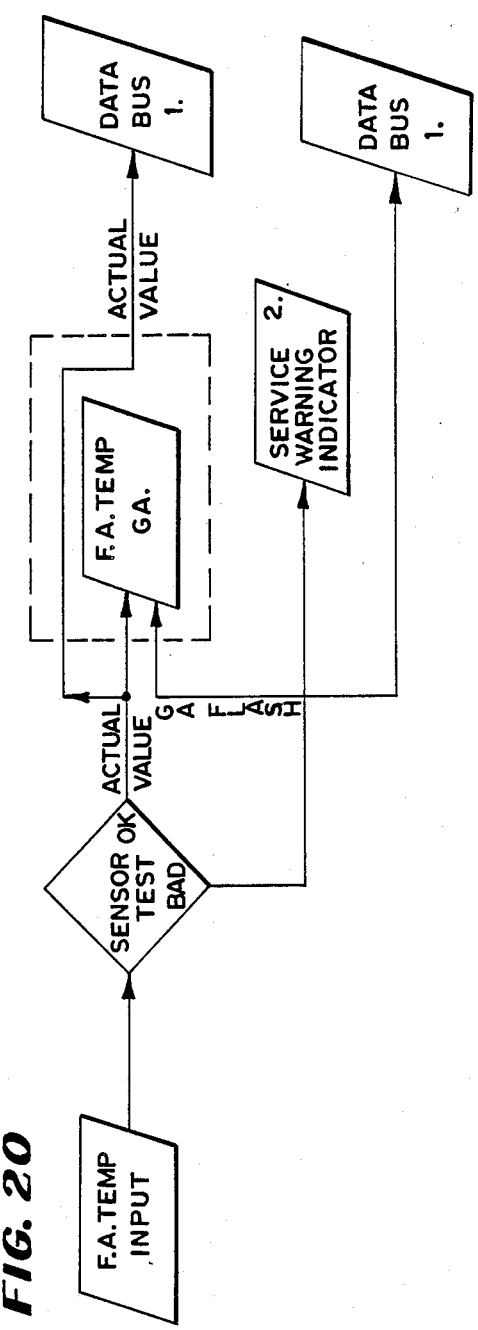
Figures 21, 22:
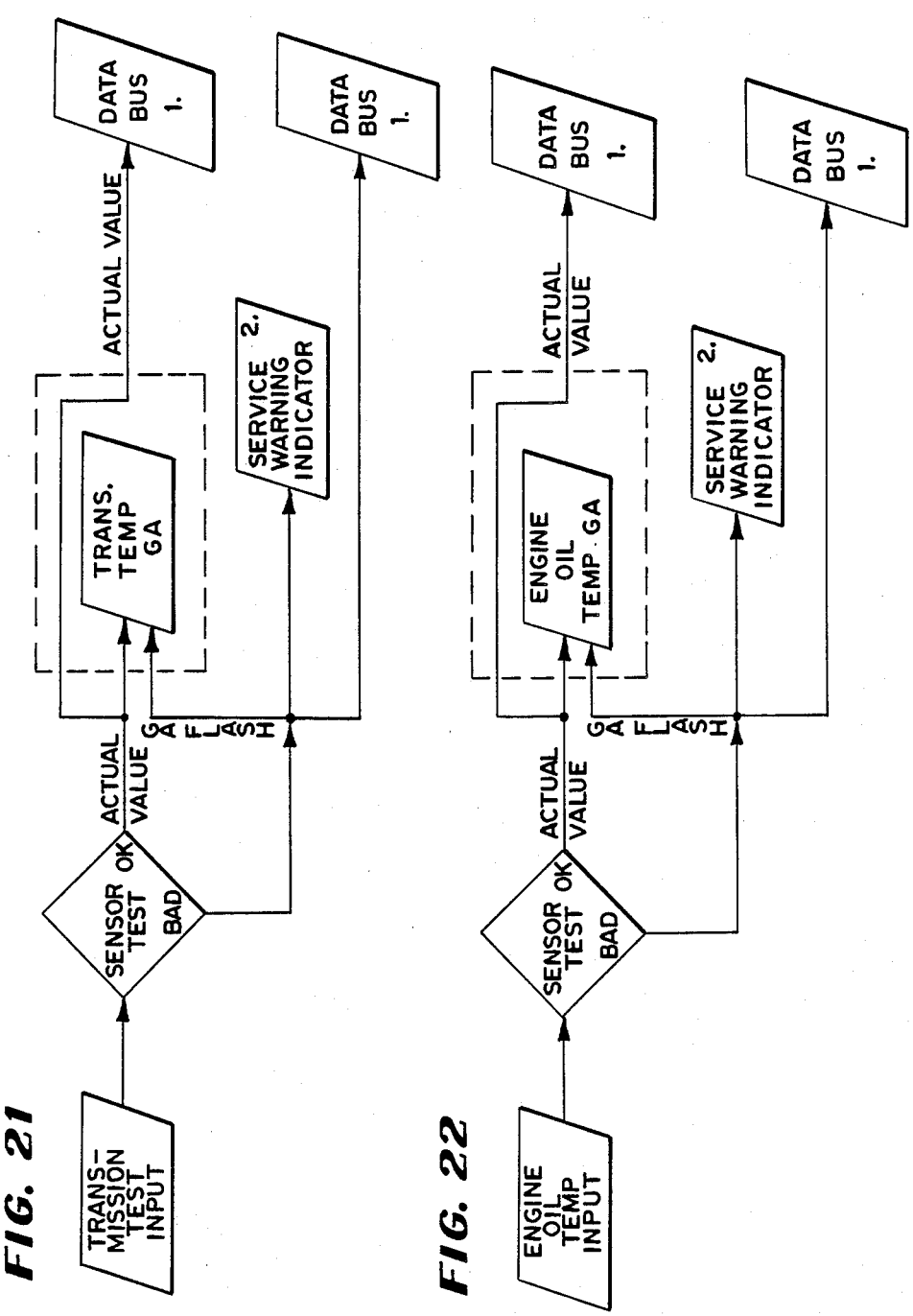

Similar routines are carried out in FIG. 20 for the front axle oil temperature sensor signal, in FIG. 21 for the transmission oil temperature signal and in FIG. 22 for the engine oil temperature signal.

FIGS. 23–30 illustrate various routines that can be carried out by the microprocessor 242 forming part of the driver interface module 20 and the recorder module 21.

Once the power is on, a self test routine is performed and then the menu such as driver menu, fuel menu, load menu, cost menu or maintenance menu is selected.

For the driver menu a write inhibit determination is made if the vehicle is moving. In this respect, if the truck is moving, a speed signal input causes a write inhibit function.

If the vehicle is not moving, no write inhibit function is generated and the information can then be input by the driver, such as vehicle ID, driver ID, driver domicile, driver route, driver status or road condition.

In like manner, if a load menu was selected a write inhibit function would be initiated if the vehicle is moving.

If the vehicle is not moving, then the load information such as load, cost, pickup place, drop place, gross rate, trailer number, terminal number can be input by the driver.

The same protocol is followed for cost and for maintenance.

In other words, if the vehicle is moving the driver is inhibited from writing and entering any data. The vehicle has to be at standstill for the driver to input data.

Figure 23:
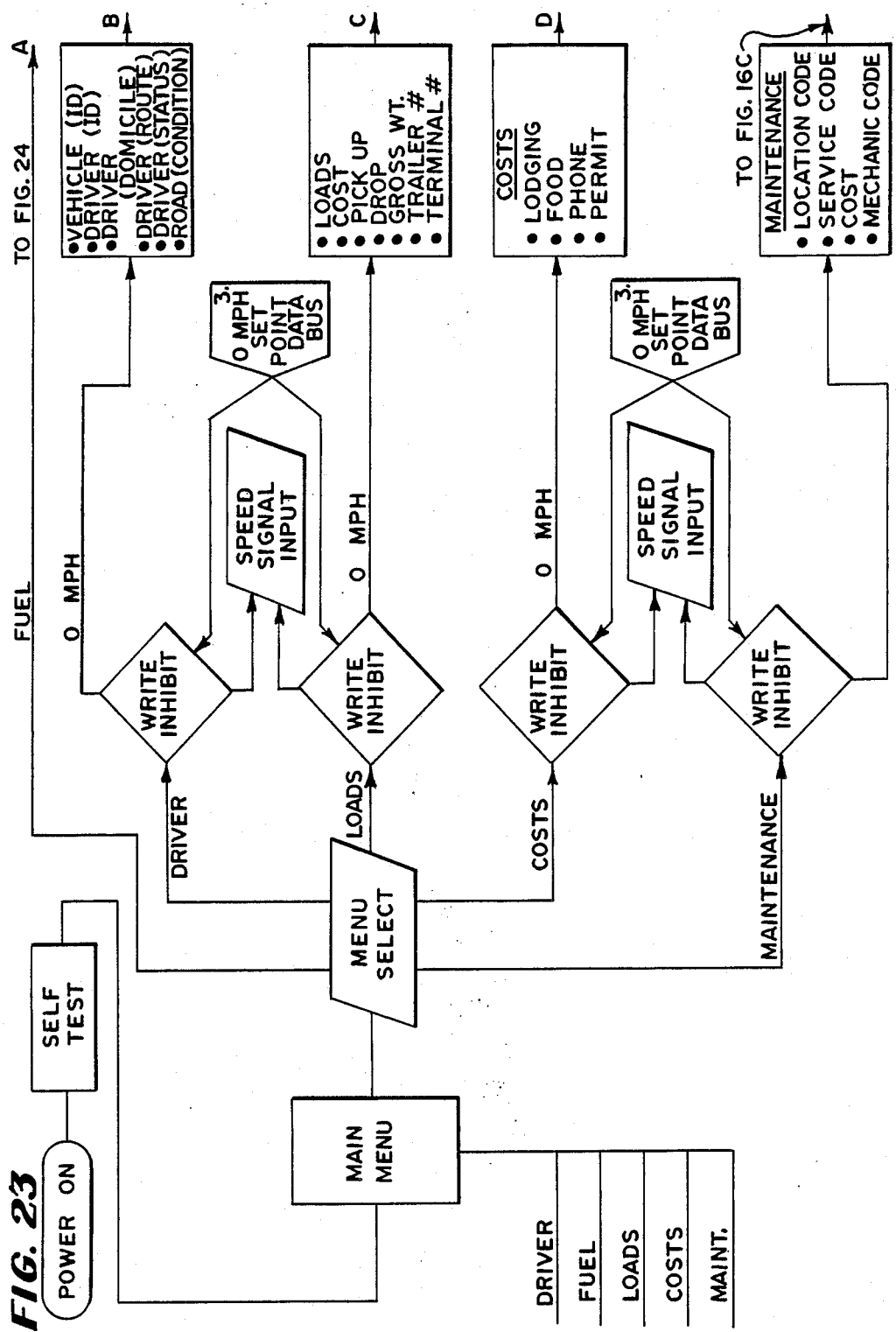
FIGS. 23-30 are flow charts of the routine or protocol carried out by the microprocessor in the driver interface module and the recorder module shown in FIG. 3.
Figure 24:
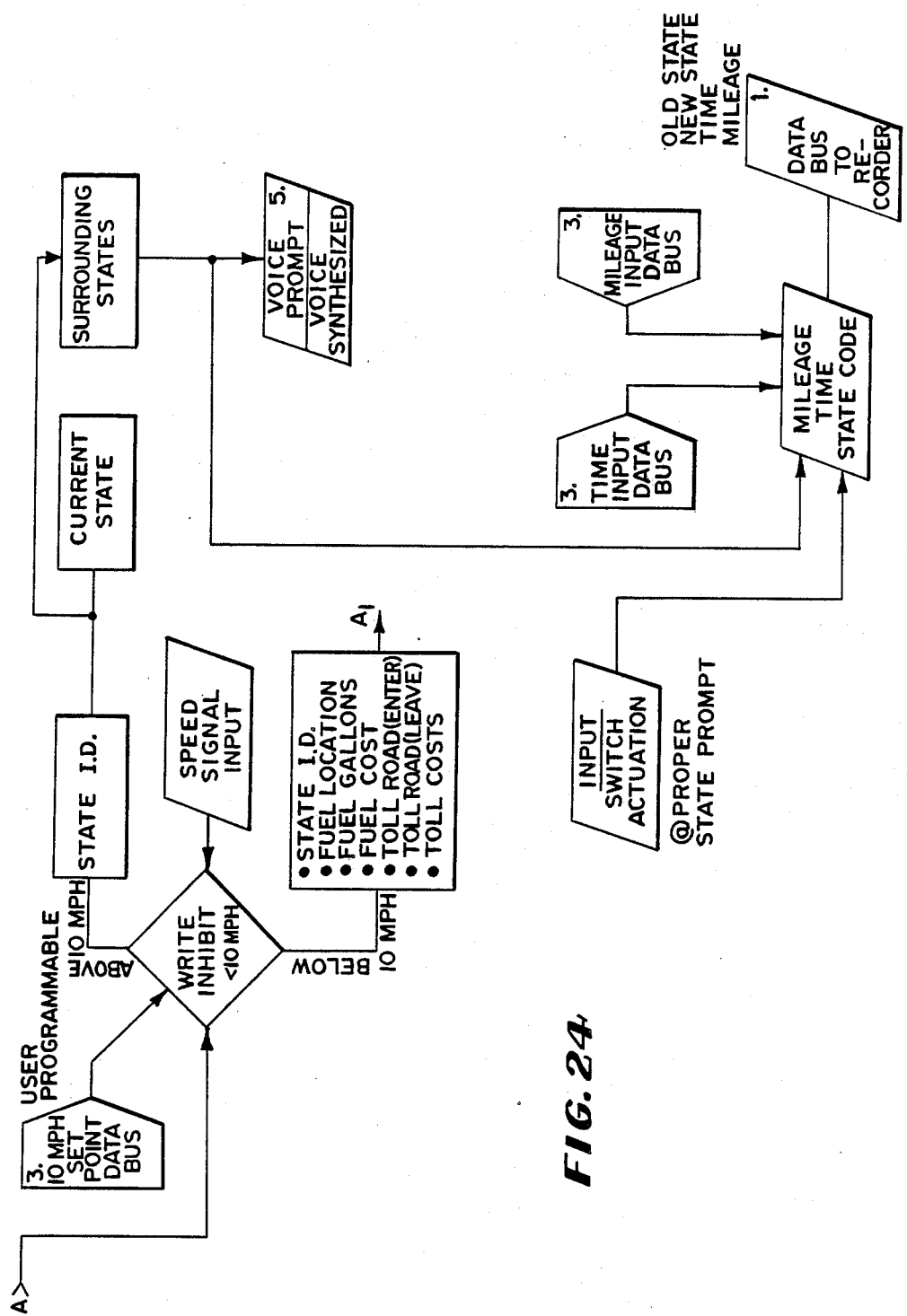

It will be noted that if the fuel menu had been selected, in the routine shown in FIG. 23 a write inhibit function will be established if the speed is more than 10 miles per hour as determined by a set point of 10 miles per hour as shown in FIG. 24.

Figure 25:
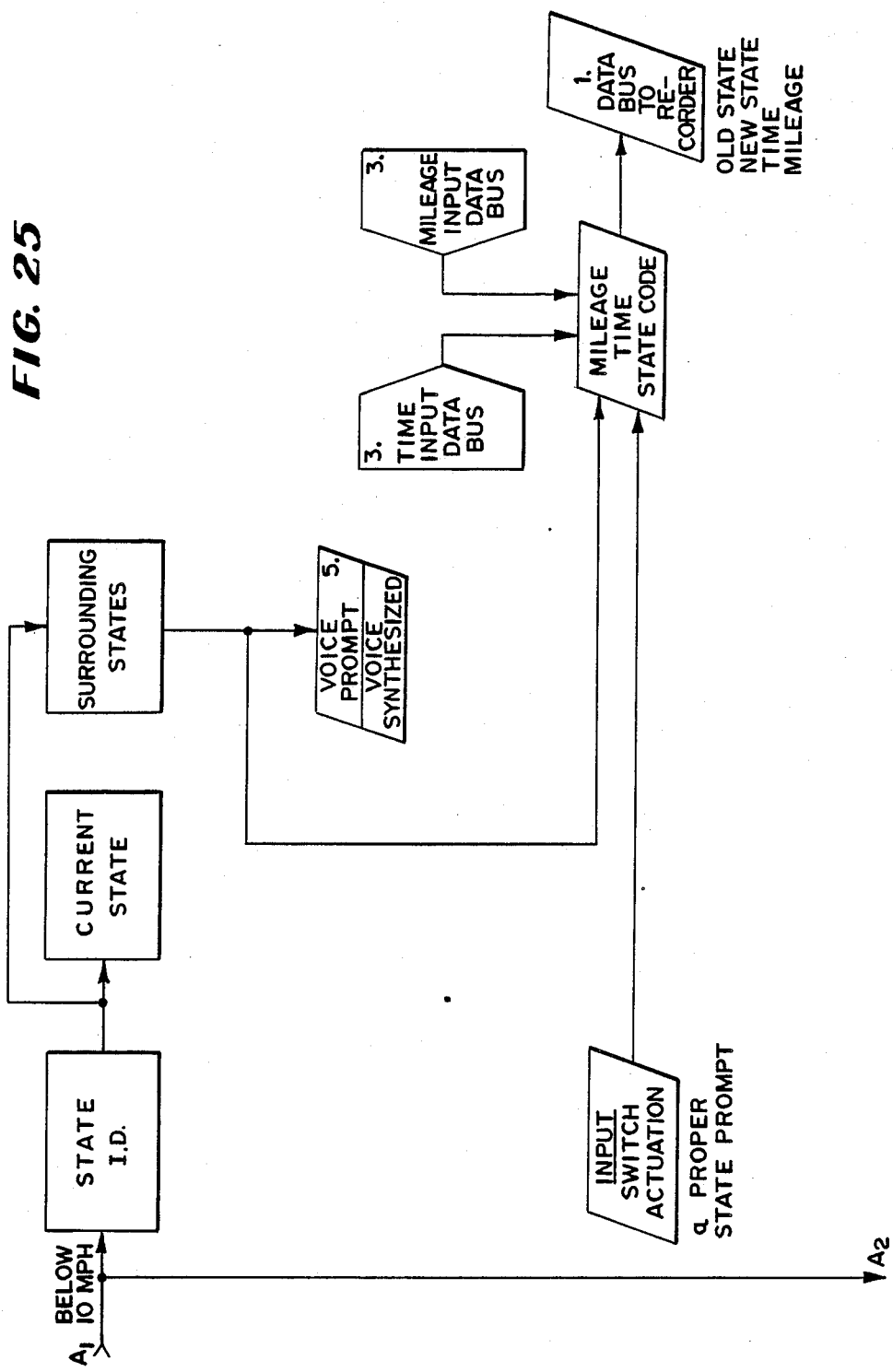

If the speed is below 10 miles per hour, then the state ID, fuel location, fuel gallons, fuel cost, toll road, enter toll road, leave, and toll cost are displayed and the program goes on to the routine shown in FIG. 25.

A similar protocol is then followed in FIG. 25 as followed in FIG. 24 if the speed is below 10 miles per hour. In this respect, the state ID is determined, then the current state is determined, as well as the surrounding states, followed by a audio prompt, audio synthesized, and a mileage, time and state code are generated relative to a time input, a mileage input and an input switch actuation. Then the data is supplied to the recorder via a data bus.

Figure 26:
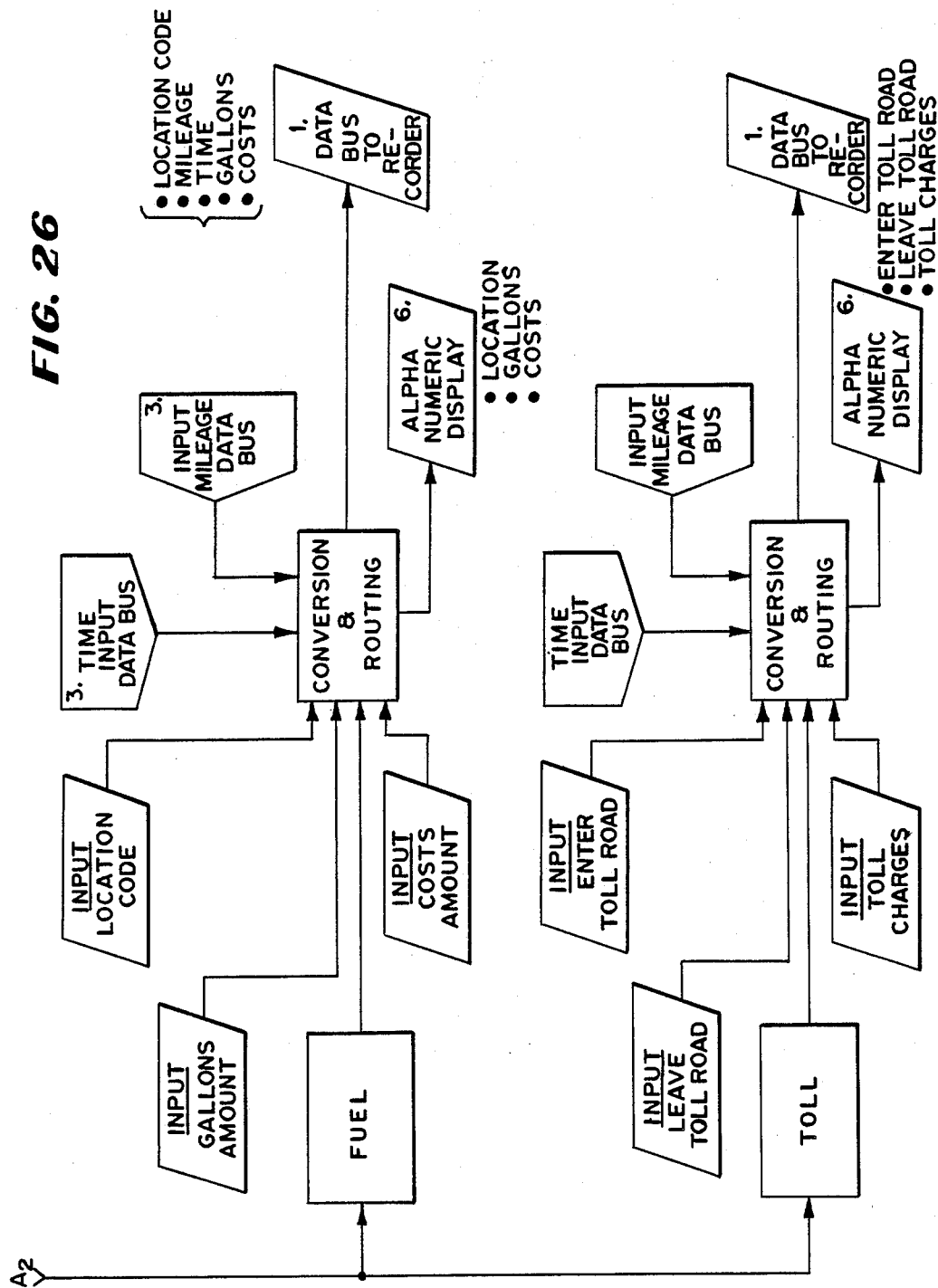

Also, the signal "below 10 miles per hour" can also be supplied with a fuel menu and a total input as shown in FIG. 26.

The fuel output is then compared with input gallons, input cost, location code, time input and mileage input such that conversion and routing functions can be performed and the location, gallons and cost can be displayed on the alphanumeric display and the location code, mileage, time, gallons and cost converted signals can then be supplied to the recorder via the data bus.

The "below 10 miles per hour" signal can also be supplied with a TOLL menu and compared with toll charges, input of leaving toll road, input of entering toll road, time input and mileage input. Conversion and routing is then performed with this data to provide, on the alphanumeric display, the enter toll road time, the leave toll road time and the toll charges. Also, this information is supplied to the recorder via the data bus.

Figure 27:
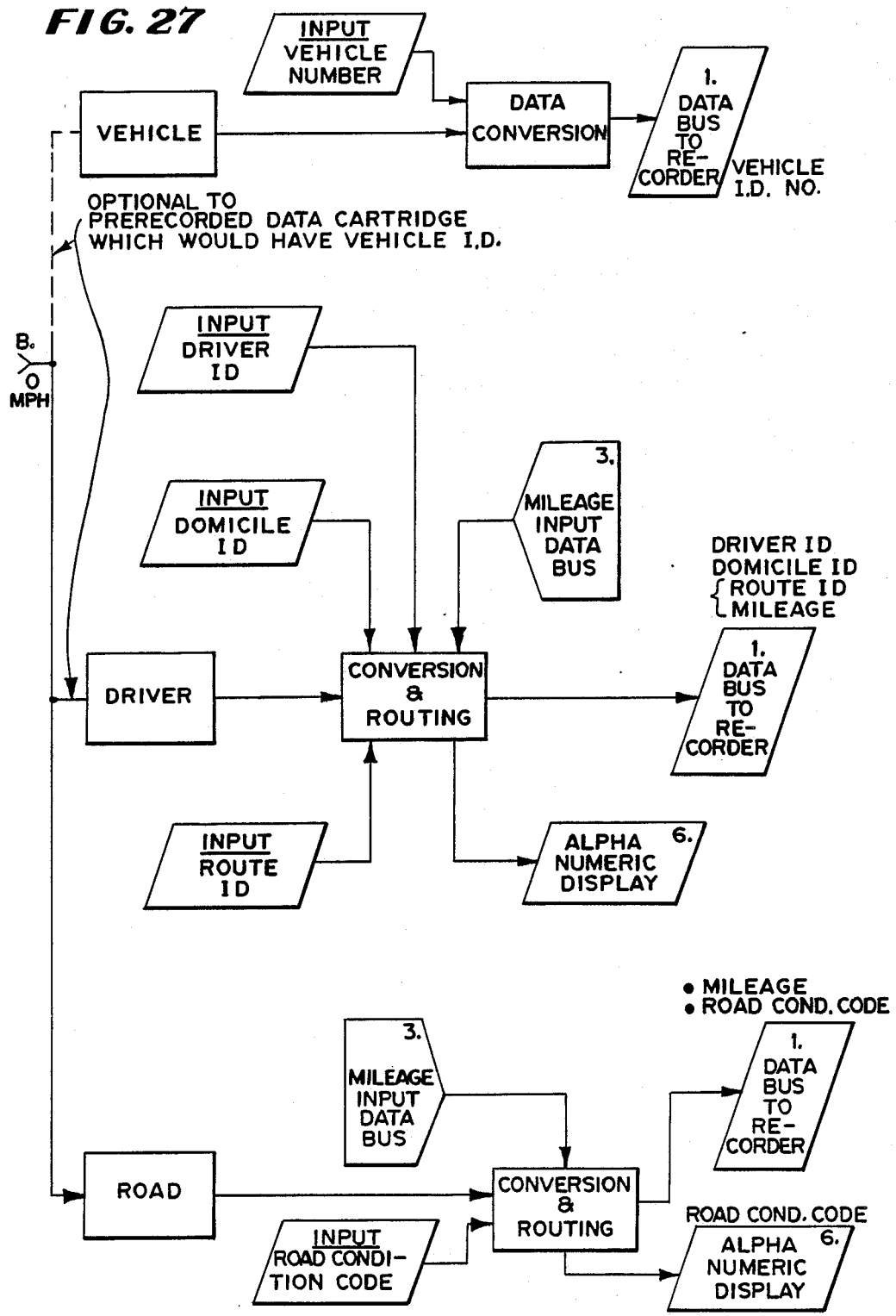

Now, if 0 miles per hour was detected in the driver input menu in FIG. 23, the vehicle ID, driver ID, etc. are processed as shown in FIG. 27. In this respect, a vehicle number is input to a data conversion operation and then the vehicle data are supplied to the recorder via the data bus.

At the same time, driver information can be processed such as by comparing input driver ID, input domicile ID, input route ID, mileage input followed by a conversion and routing operation with the converted data being supplied to an alphanumeric display and/or to the recorder via the data bus.

Also, at the same time road information can be processed by comparing road data with mileage input data, road condition input data followed by a conversion process and the converted data is supplied to the alphanumeric display and to the recorder via the data bus.

Figure 28:
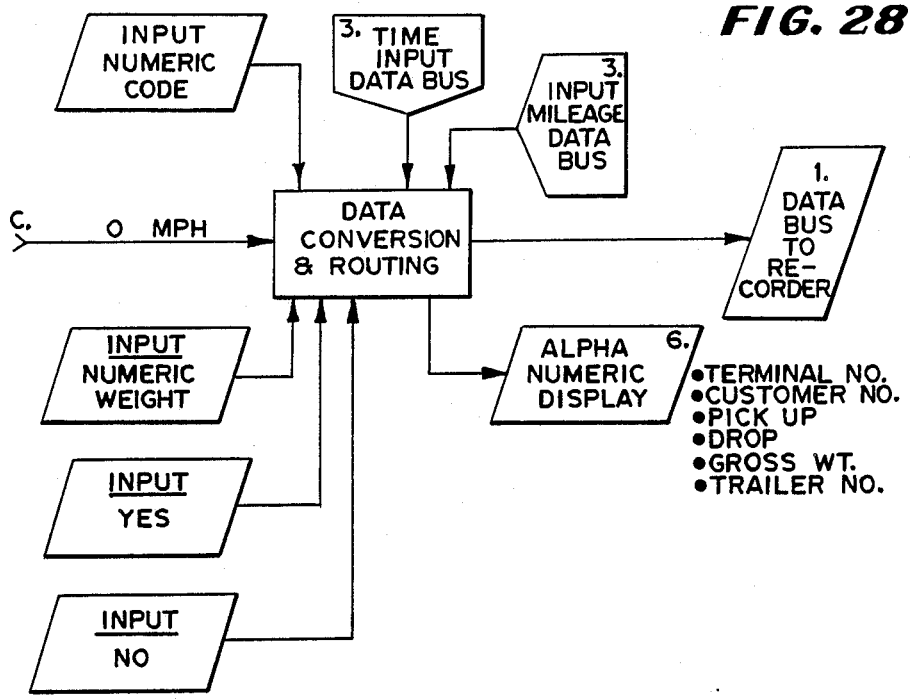
Figure 29:
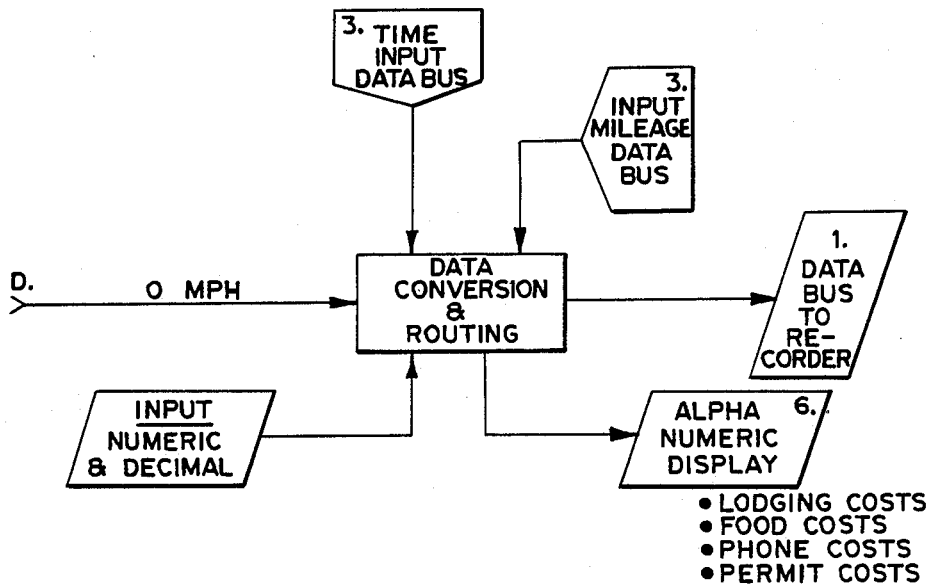

If the signal at the load and cost menu inputs in FIG. 23 is "0 MPH" the menus are processed as shown in FIGS. 28 and 29 where various data are compared, converted and routed to show on the alphanumeric display and trip drop, gross weight and trailer number in FIG. 28, and lodging costs, food costs, phone costs and permit costs in FIG. 29.

Returning now to FIG. 23, if the menu select is the maintenance menu and the vehicle is going above 0 miles per hour a write inhibit determination is made.

If the vehicle is not moving, the maintenance menu of location code, service code, cost and mechanic code are processed.

Figure 30:
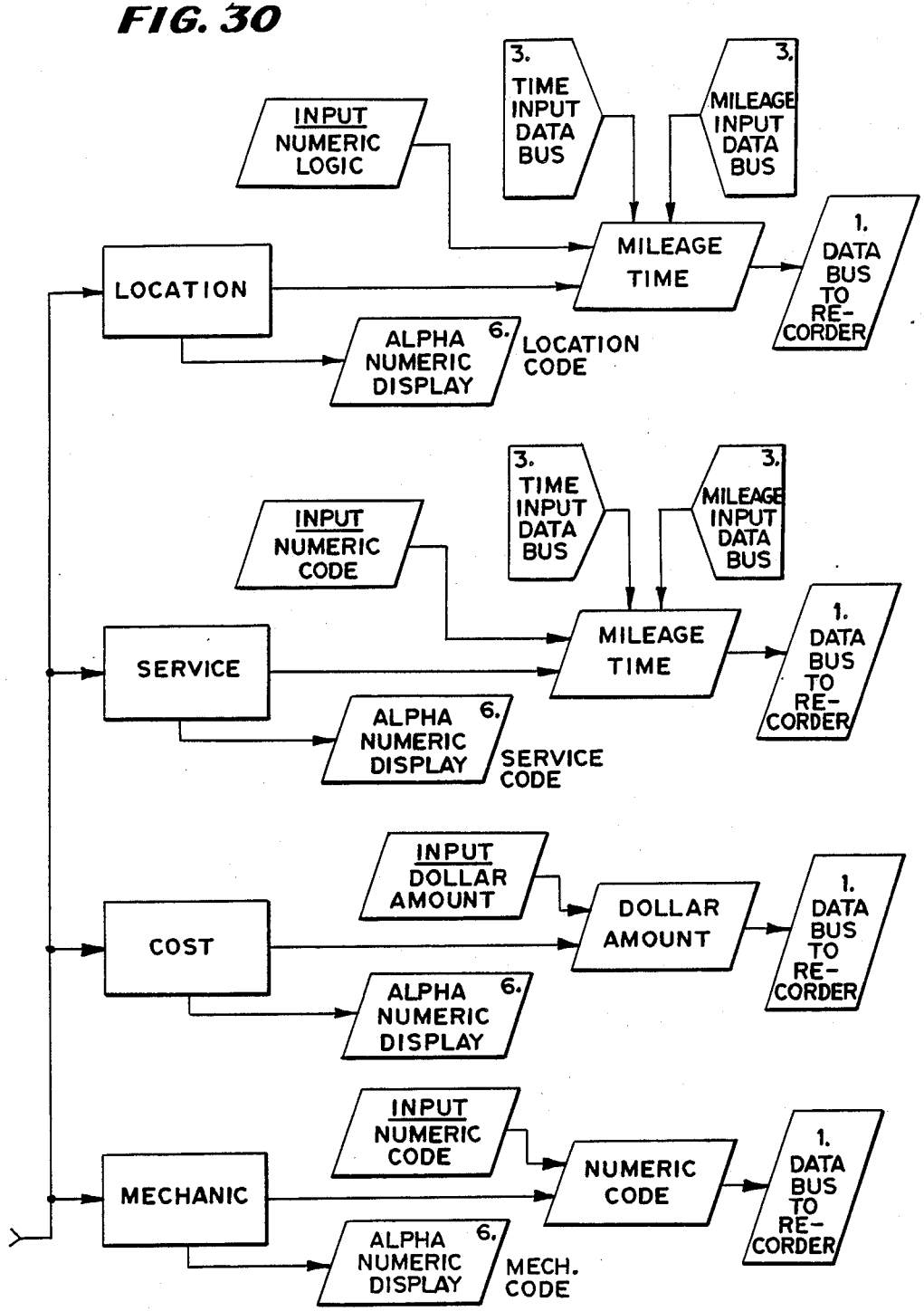

From there the program goes to the routine shown in FIG. 30 for processing menus such as location, service, cost and mechanic.

For location, this is supplied to the alphanumeric display and then processed for mileage time relative to numeric logic, time input and mileage input. The resulting data is then supplied to the recorder via the data bus.

For service, the service code is displayed in the alphanumeric display and then the service value is compared with a numeric code, time input, mileage input and converted data is then supplied to the recorder via the data bus.

For cost, the cost is displayed on the alphanumeric display and compared with dollar amount to provide a converted cost signal which is supplied to the recorder via the data bus.

For the mechanic, the mechanic code is displayed on the alphanumeric display and compared with the numeric code and then the numeric code is supplied to the recorder via the data bus.

Figure 31:
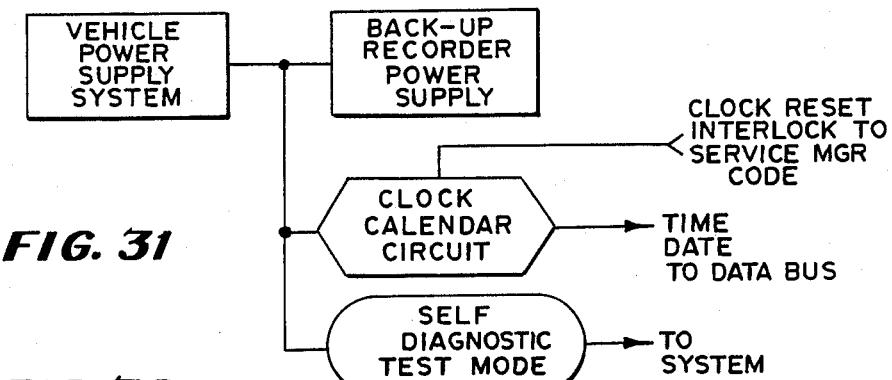
FIG. 31 is a flow chart of the routine or protocol carried out by the microprocessor in the recording/transceiving module of the truck operation monitoring system of the present invention.

FIG. 31 shows the simple routine carried out by the microprocessor 242 when used in the recording module 21. Here, the vehicle power supply is checked and the backup battery for the recorder power supply is checked. The vehicle power supply is supplied to a clock calendar circuit to output time date and to a self diagnostic test mode circuit for the overall system 10.

The clock calendar circuit has an input of clock reset and interlock to service manager code.

Figure 32:
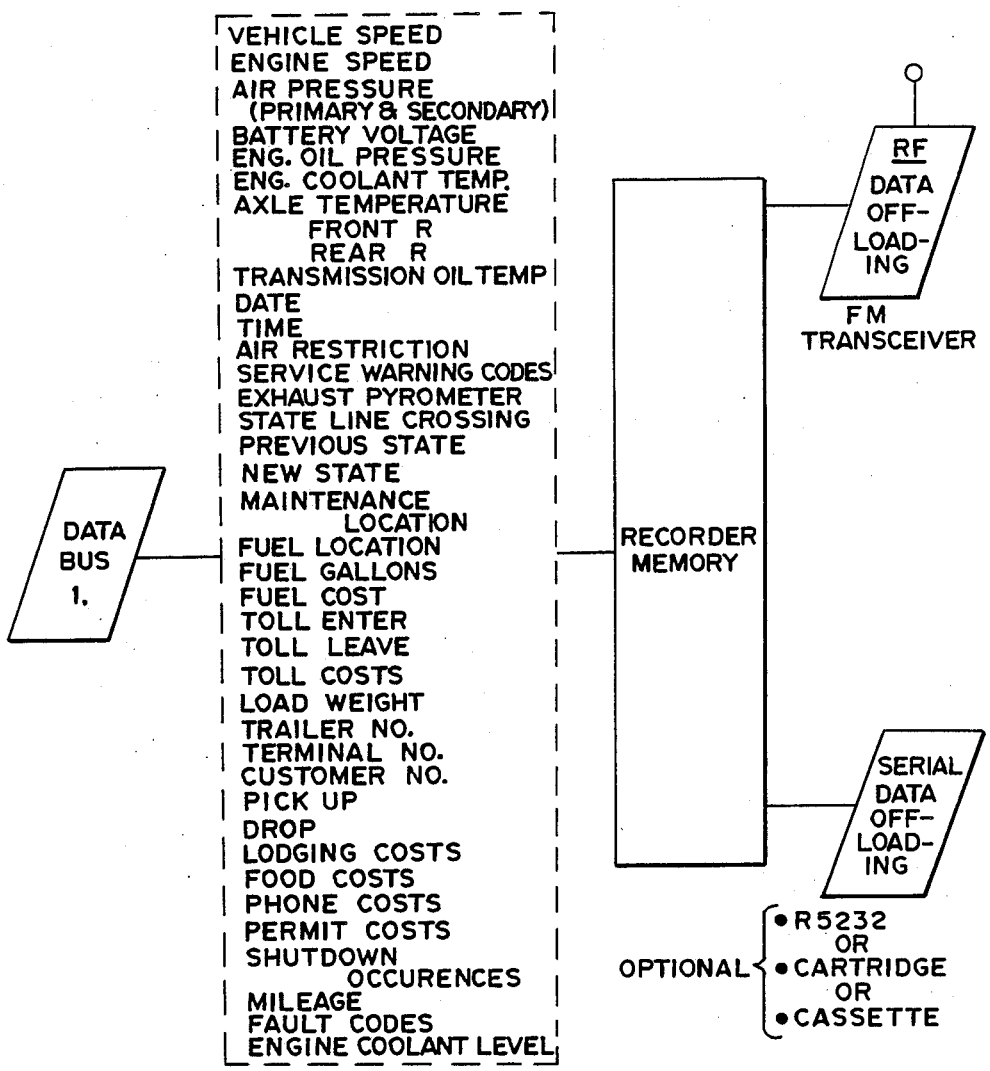
FIG. 32 is a block schematic diagram of the recording/transceiving module of the truck operation monitoring system of the present invention and shows the various parameters which are loaded into a memory of the system and then off-loaded when polled by a radio signal.

FIG. 32 illustrates a block diagram and table showing the recording transceiver module protocol and shows the various parameters which are loaded into the recorder memory and then offloaded when polled by radio signal or by an accessing signal from a larger processing apparatus, cartridge or cassette via a serial interface such as serial interface ports 14.

The center or primary instrument gauge module or cluster 32 contains the necessary circuitry required to activate an engine shutdown in the event of a mechanical failure which could damage the engine. A block circuit diagram of the engine shutdown circuitry is shown in FIG. 33. This circuitry includes a normally closed relay 302 and a normally closed solenoid 304 in the fuel line.

There are three input conditions to the primary cluster 32 which will trigger an engine shutdown sequence to begin. These conditions are as follows:

1. Very low engine oil pressure.
2. Very high water temperature.
3. Very low water level (optional).

It will be appreciated, however, that other inputs could be added such as axle temperature and air pressures.

In some engines, such as the Cummins engine, a normally closed fuel shut-off solenoid is provided and the wiring harness 188 can contain a jumper which can be installed in place of the normally closed relay 302 whenever the engine shutdown feature is not desired. Furthermore, the fuel shut-off solenoid 304 can be added to the system if an engine shutdown feature is desired.

The flowchart for the routine or program carried out during the engine shutdown sequence is shown in FIG. 34.

STEP 1. Here on the initial vehicle startup, all parameters are reset and the engine fuel solenoid 304 is energized.

STEP 2. Here the vehicle is operating with normal pressures, levels and temperatures.

STEP 3. Here failure in the system causes input parameter value of one of the critical parameters such as engine oil pressure, water temperature, water level to stray outside of a normal operating value.

STEP 4. An audio alarm is activated and the appropriate gauge is caused to flash to notify the driver. At this point, the driver should fix the fault if he can.

STEP 5 Continued operation of the vehicle under the fault condition causes the input parameter values to reach shutdown levels.

STEP 6. An audio alarm is actuated and continues to be activated. At the same time, the engine shutdown warning light lamp is illuminated. Again, the driver should attempt to fix the fault.

STEP 7. Here the system allows the driver some time to move the vehicle off the road prior to the engine shutdown operation.

STEP 8. The center cluster 32 sends a signal to the normally closed relay 304 which deenergizes the fuel solenoid. At this point, the engine shutdown warning lamp and the audio alarm remain activated.

The engine shutdown sequence is designed to provide the maximum protection for the vehicle while allowing the driver some options for handling the situation once the sequence has begun. As can be seen from the flowchart, once shutdown has occurred, the ignition key must be cycled to re-start the engine and reset the warning alarm and indicators.

If the input parameters are still outside normal operating values, the entire sequence is repeated. This provides the driver with another 30 second delay in which to move the vehicle to the side of the road.

It is to be appreciated that modifications can be made to the system 10 without departing from the teachings of the present invention. For example, a voice responsive/manually operated, data call up and/or data input system can be employed in addition to or in place of the manually operated keys or buttons on the keyboard 99 and/or keyboard 138 as disclosed in U.S. Pat. No. 4,677,429, the disclosure of which is incorporated herein by reference.

From the foregoing description, it will be apparent that the truck operation monitoring system of the present invention has a number of advantages some of which have been described above and others of which are inherent in the invention. Accordingly, the scope of the invention is Only to be limited as necessitated by the accompanying claims.

We claim:

1. An on board truck operation monitoring system a portion of which is mounted in a truck cab and which comprises:
    a plurality of sensors, each positioned to sense an operating parameter of the truck;
    a primary instrumentation module including primary instrument gauges mounted in the truck cab and data processing means comprising microprocessor means and memory means including a RAM and ROM for processing data in accordance with an instruction set stored in said ROM, means for coupling said sensors to said microprocessor means, display means coupled to said microprocessor means for displaying operating parameter data such as data generated by said sensors, and said RAM and ROM being coupled to said microprocessor means for storing said operating parameter data from said sensors in said RAM and said instruction set in said ROM;
    operator input means for actuating said microprocessor means for selectively displaying data on said display means, for altering and executing portions of the instruction set, for inputting operator data and for selectively displaying operating parameter data;
    said operator input means further including a cab mounted driver interface module coupled to said primary instrument module and including a panel having a driver interface display for displaying said operator data and a driver interface keyboard on said panel including number keys, specific function keys and programmable function keys for inputting said operator data into said memory means;
    radio frequency link means for communicating at least said operating parameter data and said operator data from said memory means to a larger off board data processing apparatus,
    said larger off board data processing apparatus comprises radio transmitting and receiving means for polling said radio frequency link means for automatically retrieving data from said memory means, and
    said microprocessor means including means for carrying out a self diagnostic mode of operation of the system in which all the sensors are checked to see if they are working properly and in which said radio frequency link means for communicating from said memory means to the larger off board processing apparatus is checked to make certain it is functioning properly.

2. The system of claim 1 wherein said driver interface keyboard includes four specific function keys and six programmable function keys.

3. The system of claim 1 wherein said primary module includes an instrument panel and said primary instrument gauges include a plurality of gauges displaying sensed operating parameters from said sensors mounted thereon including a tachometer, a speedometer, a fuel gauge, an oil gauge, a water temperature gauge, a voltage gauge and at least one air pressure indicator.

4. The system of claim 3 wherein said speedometer has a digital display and an analog display.

5. The system of claim 3 wherein said tachometer has a digital display and an analog display.

6. The system of claim 3 wherein said oil gauge and voltage gauge selectively alternate in being displayed on said display means, in response to operator instructions entered on said operator input means.

7. The system of claim 3 wherein said fuel gauge and first and second air pressure indicators selectively alternate in being displayed on said display means, in response to operator instructions entered on said operator input means.

8. The system of claim 3 including an elongate display area along the top edge of the instrument panel having dedicated display areas each having indicia therein identifying a selected parameter.

9. The system of claim 8 wherein said display areas include displays for: left turn, engine shutdown, oil filter, water level, high beam, air suspension, power drive lock, rear light and right turn and said system includes circuit means, including said microprocessor means, coupled between said sensors and said display for illuminating the display areas for an operating parameter in response to operator instructions and input from said sensors.

10. The system of claim 3 wherein at least one of said gauges includes an analog display and a digital display and said system includes circuit means for causing one of the analog display and digital display of the gauge mounted on the panel for the primary instrumentation module selectively to flash on and off in response to sensing by said microprocessor means that the said gauge is defective and in response to sensing that the parameter being measured is outside of a predetermined range contained in the instruction set.

11. The system of claim 8 including circuit means for selectively generating an audible alarm in response to sensing by said microprocessor means that one of said plurality of sensors is defective and in response to sensing that the parameter being measured is outside of a predetermined range contained in the instruction set.

12. The system of claim 1 further comprising a cab mounted secondary instrumentation module including at least one gauge for displaying said operating parameter data not displayed on said primary instrumentation module.

13. The system of claim 12 wherein said secondary instrumentation module is mounted in the truck cab to the left of the primary first named instrumentation module and includes (a) a panel having at least one gauge thereon for displaying a truck operating parameter and (b) means for coupling said secondary module to said primary module.

14. The system of claim 1 wherein said memory means comprises a recorder operatively connected to said microprocessor means for receiving data from said RAM, to said driver interface display and to said driver interface keyboard.

* * * * *